US011676098B2

(12) United States Patent
Berti et al.

(10) Patent No.: US 11,676,098 B2
(45) Date of Patent: Jun. 13, 2023

(54) DIGITAL TWIN MANAGEMENT IN IOT SYSTEMS

(71) Applicant: INTERNATIONAL BUSINESS MACHINES CORPORATION, Armonk, NY (US)

(72) Inventors: Joseph G. Berti, Highlands Ranch, CO (US); Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 16/392,414

(22) Filed: Apr. 23, 2019

(65) Prior Publication Data

US 2019/0354922 A1 Nov. 21, 2019

Related U.S. Application Data

(63) Continuation-in-part of application No. 16/190,822, filed on Nov. 14, 2018.
(Continued)

(51) Int. Cl.
*G06F 21/00* (2013.01)
*G06Q 10/087* (2023.01)
(Continued)

(52) U.S. Cl.
CPC ....... *G06Q 10/087* (2013.01); *G06F 21/6209* (2013.01); *G06K 7/10297* (2013.01);
(Continued)

(58) Field of Classification Search
CPC .............. G06Q 10/087; G06F 21/6209; G06K 7/10297; G06K 7/10366; G06K 7/1413; G06K 7/1417
See application file for complete search history.

(56) References Cited

U.S. PATENT DOCUMENTS

| 4,309,569 A | 1/1982 | Merkle |
| 5,465,221 A | 11/1995 | Merat et al. |

(Continued)

FOREIGN PATENT DOCUMENTS

| AU | 2018100150 A4 | 3/2018 |
| WO | 2017145019 A1 | 8/2017 |
| WO | 2018203886 A1 | 11/2018 |

OTHER PUBLICATIONS

IBM: List of IBM Patents or Patent Applications Treated as Related (Appendix P), May 3, 2019, pp. 1-2.
(Continued)

*Primary Examiner* — Ghazal B Shehni
(74) *Attorney, Agent, or Firm* — Robert D. Bean

(57) ABSTRACT

Managing digital asset representation of physical assets in IoT systems and environments. A digital twin is created, tracked, and modified throughout the physical asset's lifetime using a digital registry having a data record including a unique identifier (optionally encrypted) and a storage device location information for the digital twin. A physical tag is coupled to the physical asset and scanned for read and write operations from and to the digital twin. The digital twin can move to a new storage device across a cloud environment and the registry maintains consistent access.

18 Claims, 15 Drawing Sheets

Related U.S. Application Data

(60) Provisional application No. 62/589,222, filed on Nov. 21, 2017.

(51) Int. Cl.
    *G06K 7/10*     (2006.01)
    *G06K 7/14*     (2006.01)
    *G06F 21/62*    (2013.01)

(52) U.S. Cl.
    CPC ....... *G06K 7/10366* (2013.01); *G06K 7/1413* (2013.01); *G06K 7/1417* (2013.01)

(56) References Cited

U.S. PATENT DOCUMENTS

| | | |
|---|---|---|
| 5,521,815 A | 5/1996 | Rose, Jr. |
| 6,886,748 B1 | 5/2005 | Moore |
| 6,965,866 B2 | 11/2005 | Klein |
| 6,996,601 B1 | 2/2006 | Smith |
| 7,194,529 B2 | 3/2007 | Kupiec |
| 10,073,864 B1 | 9/2018 | Koeten |
| 10,115,068 B2 | 10/2018 | Vivier |
| 10,915,895 B1 | 2/2021 | Fogg |
| 2003/0110126 A1 | 6/2003 | Dunkeld |
| 2003/0131084 A1 | 7/2003 | Pizzorni |
| 2005/0246193 A1 | 11/2005 | Roever |
| 2007/0007337 A1 | 1/2007 | Clark |
| 2009/0210083 A1 | 8/2009 | English |
| 2012/0297303 A1 | 11/2012 | Gromek |
| 2014/0278461 A1 | 9/2014 | Artz |
| 2016/0026717 A1 | 1/2016 | Kelsey |
| 2016/0026960 A1 | 1/2016 | Carnahan |
| 2016/0247129 A1* | 8/2016 | Song ............... G06Q 10/20 |
| 2016/0328411 A1* | 11/2016 | Easlea ............. G06F 9/453 |
| 2016/0333854 A1 | 11/2016 | Lund |
| 2016/0364787 A1 | 12/2016 | Walker et al. |
| 2017/0129254 A1 | 5/2017 | Nardiello |
| 2017/0286572 A1 | 10/2017 | Hershey et al. |
| 2017/0323403 A1* | 11/2017 | Johnson .......... G06Q 10/06314 |
| 2018/0018723 A1* | 1/2018 | Nagla ............. H04L 9/3236 |
| 2018/0109395 A1 | 4/2018 | Berdy et al. |
| 2018/0174255 A1 | 6/2018 | Hunn et al. |
| 2018/0196409 A1 | 7/2018 | Ben-Bassat |
| 2018/0202892 A1* | 7/2018 | Vaskinn ............ G01M 5/0041 |
| 2018/0270244 A1 | 9/2018 | Kumar et al. |
| 2018/0330342 A1 | 11/2018 | Prakash |
| 2018/0374283 A1 | 12/2018 | Pickover et al. |
| 2019/0005195 A1 | 1/2019 | Peterson |
| 2019/0057382 A1 | 2/2019 | Wright et al. |
| 2019/0130484 A1 | 5/2019 | de Jong |
| 2019/0180291 A1 | 6/2019 | Schmeling |
| 2019/0251489 A1 | 8/2019 | Berti |
| 2019/0251575 A1 | 8/2019 | Berti |
| 2019/0317935 A1 | 10/2019 | Berti |
| 2020/0234386 A1 | 7/2020 | Blackman |
| 2020/0366633 A1* | 11/2020 | Suarez ............... G06F 16/22 |

OTHER PUBLICATIONS

Berti, Pending U.S. Appl. No. 16/392,404, filed Apr. 23, 2019, entitled: "Blockchain-Implemented Smart Contract Management for Digital Twin Assets", pp. 1-76.

Berti, Pending U.S. Appl. No. 16/392,421, filed Apr. 23, 2019, entitled: "Blockchain-Implemented Digital Agreement Management for Digital Twin Assets", pp. 1-82.

Berti, Pending U.S. Appl. No. 16/392,426, filed Apr. 23, 2019, entitled: "Digital Agreement Management on Digital Twin Ownership Change", pp. 1-88.

IBM: List of IBM Patents or Patent Applications Treated as Related (Appendix P), Apr. 21, 2021, 2 pages.

Neisse et al., "A Blockchain-based Approach for Data Accountability and Provenance Tracking", In Proceedings of ARES '17, Reggio Calabria, Italy, Aug. 29-Sep. 1, 2017, 10 pages.

Mell et al., "The NIST Definition of Cloud Computing", Recommendations of the National Institute of Standards and Technology, NIST Special Publication 800-145, Sep. 2011, 7 pages.

Molina-Jimenez et al., "Implementation of Smart Contracts Using Hybrid Architectures with On and Off-Blockchain Components," 2018 IEEE 8th International Symposium on Cloud and Service Computing (SC2), Paris, 2018, pp. 83-90.

Molina-Jimenez et al., "A Model for Checking Contractual Compliance of Business Interactions," in IEEE Transactions on Services Computing, vol. 5, No. 2, pp. 276-289, Apr.-Jun. 2012.

Molina-Jimenez et al., "On and Off-Blockchain Enforcement of Smart Contracts", (Submitted on May 2, 2018) https://arxiv.org/abs/1805.00626, 7 pages.

Xu et al., "Pro-active Monitoring of Electronic Contracts." In: Eder J., Missikoff M. (eds) Advanced Information Systems Engineering. CAiSE 2003. Lecture Notes in Computer Science, vol. 2681, pp. 584-600, Springer, 2003.

Berti, Pending U.S. Appl. No. 16/190,822, filed Nov. 14, 2018, entitled: "Exchanging Asset, Maintenance, And Spare Parts Information Via Blockchain", pp. 1-68.

\* cited by examiner

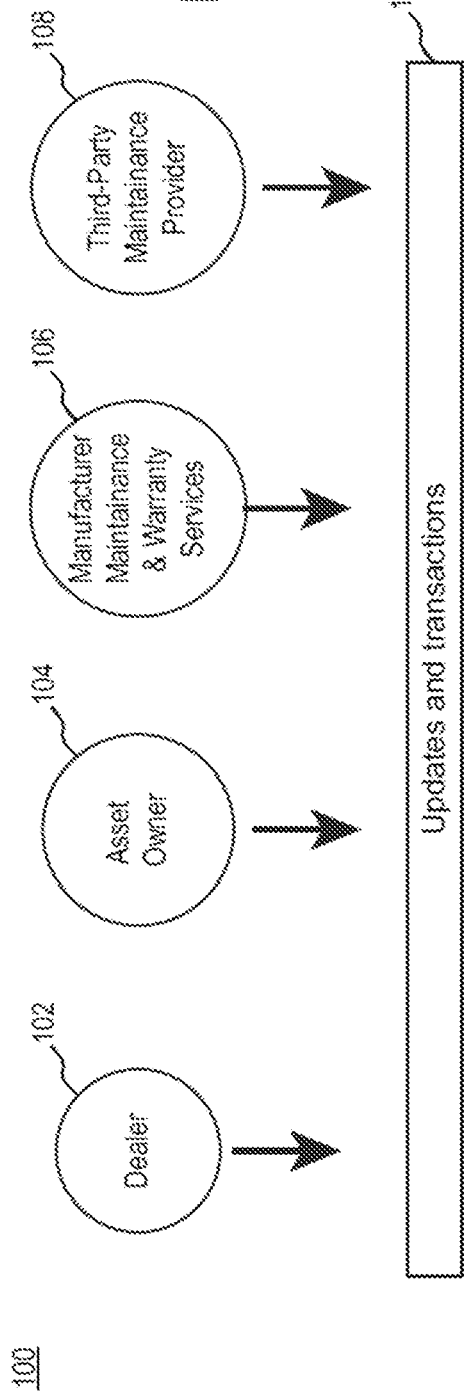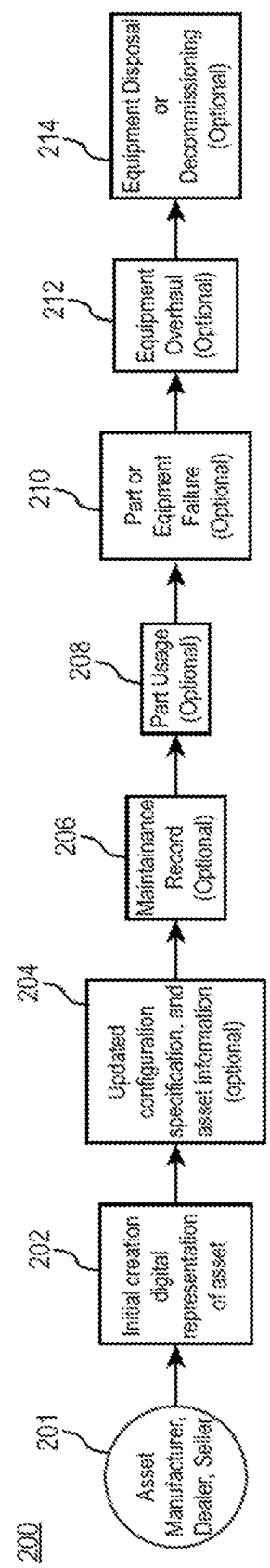

400

Example log record verifiable and encrypted via blockchain
Log 1 – Asset Manufacture (start of blockchain)
Asset Description, Serial number, Manufacturer Date, Equipment Attributes, Bill of Material (parts), Recommended Maintenance, 3D Part Specifications
Earth mover, 123456, Nov-1-2016, Yellow|150HP|front loader, 123|124|125|126|127:501,502,503|Oil change every 1000 hours|(reference to cad file))
Log 2 – Aftermarket parts added by dealer
(Hydraulic front loader,80010|GPS Tracking Unit, 53020)
Log 3 – Maintenance
Type of Maintenance, Labor Hours, Parts Used, Performed By, Date Performed
1000 Hour Maintenance|1.5 HR|Oil:801,Filter:802,Grease:803|Company repair tech Jim Smith|-Dec-1-2016
Log 4 – Equipment Failure
Sensor|Failure Code|Failure Date
Engine temperature|EN010|Dec-2-2016
Log 5 – Warranty Claim
Claim Type|Claim ID|Claimed By|Claim Date
Engine|80202|Company xxxx|Dec-3-2016
Log 6 – Part criticality
Subassembly:part|MTBF|MTTR
Engine:Gasket|1000 HR|5 HR
Log 7 – Change History
Change type|Part name|part ID|date installed|qty
Add part|vibration sensor|003030|Dec-10-2016|1
Log 8 – Operating Condition
Condition|Condition Value|Date
Vibration|.05|Dec-15-2016
Log 9 – Overhaul or Decommission Equipment
Event|Date
Overhaul|Nov-17-2017

ASSET REPORTING

Report 1 - Asset Details
Report 2 – Warranty History
Report 3 – Failure History
Report 4 – Maintenance History
Report 5 – Part Usage History

600

DIGITAL TWIN MANAGEMENT IN IOT SYSTEMS

This application is a continuation-in-part of co-pending patent application Ser. No. 16/190,822, titled Exchanging Asset, Maintenance, And Spares Parts Information Via Blockchain, filed at the United States Patent and Trademark Office on Nov. 18, 2018, whose specification and drawings are incorporated herein by reference in their entirety.

BACKGROUND

Embodiments of the present invention generally relate to the field of digital record representation and digital tracking of physical assets to enable computer-assisted asset management and maintenance, and more particularly to digital twins in Internet of Things (IoT) environments.

Recent innovations in computerization of physical asset management and the introduction of remote asset monitoring have enabled asset lifetime performance monitoring and asset maintenance monitoring. Some advanced systems contain an on-board computerized system that records information about the asset. This information enables asset monitoring and failure prediction for the asset. Understanding of asset attributes, specifications, bill of material, asset parts and particularly, accurate asset maintenance records is beneficial to predict asset failures with high accuracy. In addition, knowledge of parts added to the asset, parts removed from the asset, parts replaced in the asset, parts operated in the asset along with when they were added, removed, replaced or operated leads to greater operational efficiency.

SUMMARY

Embodiments of the invention provide for methods, computer program products, and systems for managing a digital representation of a physical asset, including a digital twin representation. In embodiments of the invention where a method is provided, the method may have one or more steps that are performed by a processor executing programming instructions stored on a tangible storage device and/or on a computer programming product. The tangible storage device and the processor may be components of a system.

A summary of these embodiments is provided here.

In an embodiment, a method for managing a digital representation of a physical asset instantiates a digital representation of a physical asset on a first storage device, the digital representation having a plurality of attributes. The method may have a plurality of steps carried out by executing a plurality of programming instructions using a processor of a computer. The programming instructions may be stored on a tangible storage device. Accordingly, the processor associates a unique identifier with the digital representation of the physical asset. The processor records, in a digital registry, a data record comprising the unique identifier and a location of the digital representation of the physical asset, the location comprising location information of the first storage device.

In a related embodiment, the processor provides, in response to receiving a lookup request by a user, the location of the digital representation of the physical asset, the lookup request comprising the unique identifier.

In a related embodiment, the lookup request comprises a scanned reading of a physical tag, the scanned reading comprising the unique identifier.

In a related embodiment, the unique identifier is an encrypted unique identifier and has a corresponding decrypted unique identifier.

In a related embodiment, the processor receives, from a user, a lookup request for the digital representation of the physical asset, the request comprising the encrypted unique identifier. The processor decrypts the encrypted unique identifier to generate the decrypted unique identifier. The processor retrieves the location of the digital representation of the physical asset using the decrypted unique identifier. The processor provides the retrieved location of the digital representation of the physical asset to the user.

In a related embodiment, the processor copies the digital representation of the physical asset to a second storage device. The processor updates the data record recorded in the digital registry to associate the digital representation of the physical asset with the second storage device. The processor removes the digital representation of the physical asset from the first storage device.

In a related embodiment, the copying and updating by the processor are initiated based on detecting a change-in-ownership event for the digital representation of the physical asset. The processor updates an ownership attribute in the plurality of attributes of the digital representation of the physical asset.

In a related embodiment, the processor copies the digital representation of the physical asset to a second storage device.

In a related embodiment, the processor updates the data record recorded in the digital registry to associate the digital representation of the physical asset with the second storage device, while maintaining the association of the digital representation of the physical asset with the first storage device.

In a related embodiment, the first storage device is a computing node in a cloud computing environment.

In a related embodiment, the processor detects an event associated with the digital representation of the physical asset. The processor determines, in response to detecting the event, the location of the digital representation of the physical asset using the digital registry. The processor updates, at the first storage device, one or more of the plurality of attributes of the digital representation of the physical asset.

In a related embodiment, instantiating a digital representation of a physical asset on a first storage device includes the processor defining initial values of the plurality of attributes of the digital representation of the physical asset using one or more data fields of a digital agreement record.

In a related embodiment, the one or more data fields of the digital agreement record are selected from a list consisting of: a user manual data field, a bill of material data field, a warranty bulletin data field, a warranty claim data field, a maintenance plan data field, a maintenance history data field, a part replacement data field, a part usage data field, a physical asset specification data field, a 3-dimensional model data field, a computer-aided design data field, a fault code data field, a scheduled maintenance data field, an operating manual data field, an Internet-of-Things (IoT) sensor reading data field, an artificial intelligence model data field, a data prediction model data field, an operating history data field, an ownership data field, and a change in ownership data field.

In a related embodiment, the processor confirms, via a reading from an IoT device, physical tagging of the physical asset corresponding to the digital representation of the physical asset.

In a related embodiment, the processor provides, in response to receiving a lookup request by a user, one or more of the plurality of attributes of the digital representation of the physical asset.

In an embodiment of the invention, a method for managing a digital representation of a physical asset is provided. A processor of a system may execute programming instructions that implement the steps of the method. The processor detects an event, based on data originating from an Internet-of-Things (IoT) device, the event being associated with a digital representation of a physical asset identified using a unique identifier. The processor retrieves from a digital registry, using the unique identifier, a data record associated with the digital representation of the physical asset, wherein the data record comprises the unique identifier and a location of the digital representation of the physical asset, the location comprising location information of a first storage device storing the digital representation of the physical asset. The processor updates the digital representation on the first storage device based on the event.

In a related embodiment, the processor updates the digital representation on the first storage device based on the event by updating one or more attributes of the digital representation based on data recorded in the detected event.

In an embodiment of the invention, a method is provided. A processor of a system may execute programming instructions that implement the steps of the method. The processor instantiates a digital twin of a physical asset on a first storage device. The processor records, in a digital registry, a data record comprising a unique identifier and a location of a first storage device storing the digital twin.

In a related embodiment, the processor updates the digital twin with information detected in an event based on looking up the digital twin in the digital registry using the unique identifier.

In a related embodiment, the processor provides a user with access to the digital twin based on receiving, from the user, a unique identifier of the digital twin.

According to an embodiment of the invention, a computer system for managing a digital representation (for example, a digital twin) of a physical asset is provided. The computer system comprises one or more computer devices each of which may have one or more processors and one or more tangible storage devices; and a program embodied on at least one of the one or more storage devices, the program having a plurality of program instructions for execution by the one or more processors, the program instructions comprising instructions to execute a method according to enumerated embodiments of the invention whereby a method is provided.

According to an embodiment of the invention, a computer program product for managing a digital representation (for example, a digital twin) of a physical asset is provided. The computer program product comprises a non-transitory tangible storage device having program code embodied therewith. The program code is executable by a processor of a computer to perform a method, according to enumerated embodiments of the invention whereby a method is provided.

BRIEF DESCRIPTION OF THE SEVERAL VIEWS OF THE DRAWINGS

For the purposes of illustrating the invention, the attached drawings show certain aspects and embodiments. However, it should be understood that the invention is not limited to the precise method or process steps or system elements as shown in the accompanying drawings, but rather is further disclosed and claimed according to the claims.

FIG. 1A of FIG. 1 is a system overview illustration showing multiple events causing creation or updating of the electronic representation of the asset documented in a process flow.

FIG. 1B of FIG. 1 is an overview illustration showing multiple possible stages for creation and updating of the electronic representation of the asset.

FIG. 3 is an exemplary illustration showing the data file representing digital representation of the asset over its lifecycle.

DETAILED DESCRIPTION

Figure 2:
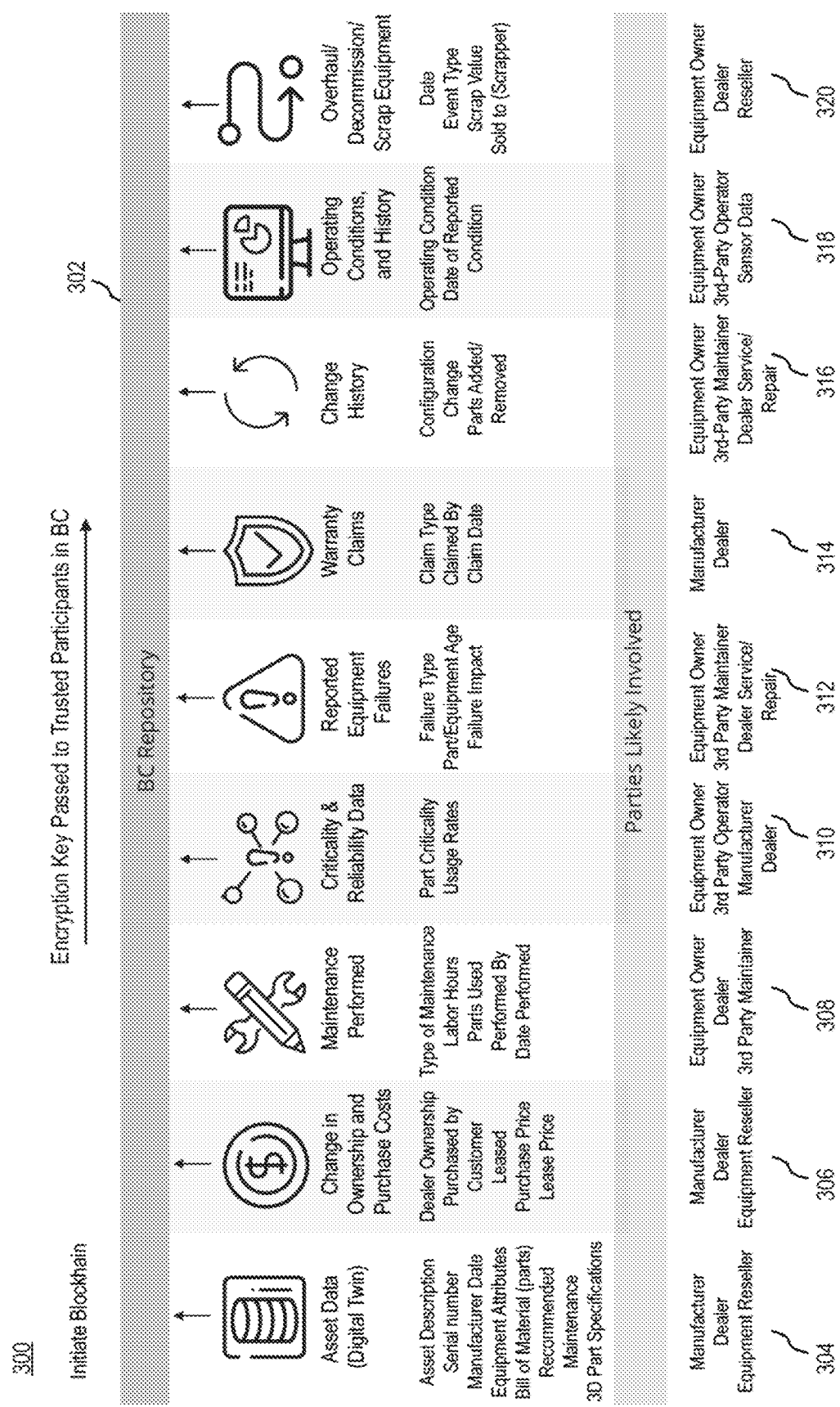
FIG. 2 is an exemplary illustration showing asset tracking through the digital representation of the asset utilizing blockchain technology.

One solution to tracking a physical asset, its components, and the changes they experience is via a "digital twin" data representation. The physical asset typically has a set of components, properties, and features, each of which may undergo state changes throughout the physical asset's lifecycle. The digital twin provides a non-trivial and technical mechanism by which computer systems in general, and Internet of Things (IoT) systems in particular, can be leveraged to improve physical asset management.

The prior art is inadequate in addressing all the limitations of digital twins, particularly in IoT systems, to enable computerized asset management. Embodiments of the present invention provide one or more functions to address the need for improved computerized asset management.

Some Definitions

Before describing embodiments of the invention in greater detail, some definitions are provided. The definitions are provided for illustration only and should not be deemed to limit the scope of embodiments of Applicant's disclosed invention. Embodiments of the invention are defined by the claims. Other definitions may be provided throughout the present disclosure, as appropriate.

According to one non-limiting definition, a physical asset refers to any physical object or entity that is capable of being represented using computer data. The physical asset may have a set of physical and non-physical attributes. The attributes may also be referred to as properties and features. The physical attributes may have states, and these states may undergo change across a dimension, such as time. Two or more changes to states of the physical attributes of the physical asset may be referred to as experiences or a history of the physical asset.

In an embodiment, the physical attributes of a physical asset may include material composition of the physical asset and its individual components (to varying degrees of granularity); the physical arrangements or configurations of the physical asset relative to other physical assets; the physical arrangements or configurations of components of the physical asset relative to one another or relative to other physical assets; functions of the physical asset or its components.

Other physical attributes are possible. For example, the physical attributes of the physical asset may include, in an embodiment, one or more IoT devices, such as IoT sensors. In an embodiment, each such sensor, in turn, may be deemed a physical asset.

In an embodiment, the non-physical attributes of a physical asset may include information that describes the physical asset and its physical attributes; a context of the physical asset relative to other physical assets or entities; and information that describes the states of the physical asset's attributes and the changes in those states over time. Two or more changes to states of the non-physical attributes of the physical asset may also be part of the experiences or the history of the physical asset.

In an embodiment, the context of the physical asset (a non-physical attribute of the physical asset) may include information that defines the physical asset relative to other physical assets or entities. Non-limiting examples of such context data may include, with respect to a physical asset: bill of material; warranty bulletins; warranty claims; maintenance plans; maintenance history; part replacement history; part usage history; specifications; 3-dimensional model and CAD drawing data; fault codes; scheduled maintenance plans; operating manuals; usage data, such as IoT sensor readings associated with the physical asset; artificial intelligence (AI) and state prediction data; operating history; ownership; ownership change history; applicable standards; ownership terms; and terms at ownership change. Each such type of context data may also have associated change information.

According to one definition, a digital twin refers to a digital representation of a physical asset (and more broadly, a computerized representation). In IoT systems, a digital twin can represent an evolving virtual data model that mimics the physical asset as well as its experiences and state changes. The digital twin may be said, in an embodiment, to store and track information about its twin physical asset.

Accordingly, in an embodiment, a digital twin stores and tracks information about physical and non-physical attributes of the physical asset; i.e., information that describes the physical asset and its physical attributes; a context of the physical asset relative to other physical assets or entities; and information that describes the states of the physical asset's attributes and the changes in those states over time.

For example, the digital twin stores and tracks the material composition of the physical asset and its individual components (to varying degrees of granularity); the physical arrangements or configurations of the physical asset relative to other physical assets; the physical arrangements or configurations of components of the physical asset relative to one another or relative to other physical assets; functions of the physical asset or its components. The digital twin may also be said to store and track properties or features of the physical asset. The digital twin may also store and track one or more states of the physical asset, and these states may change over time.

In an embodiment, a digital twin stores and tracks non-physical attributes of a physical asset. Accordingly, the digital twin stores and tracks information that describes the physical asset and its physical attributes; and information that describes the states of the physical attributes and the changes in those states over time. Two or more changes to states of the physical attributes and their states may be referred to as experiences or a history of the physical asset that the digital twin stores and tracks.

In an embodiment, the digital twin stores and tracks non-physical attributes of a physical asset that define a context for the physical asset; i.e., information that defines a relationship of the physical asset with other physical assets or entities. Non-limiting examples of such context data stored and tracked as part of the digital may include: bill of material; warranty bulletins; warranty claims; maintenance plans; maintenance history; part replacement history; part usage history; specifications; 3-dimensional model and CAD drawing data; fault codes; scheduled maintenance plans; operating manuals; usage data, such as IoT sensor readings associated with the physical asset; artificial intelligence (AI) and state prediction data; operating history; ownership; ownership change history; applicable standards; ownership terms; and terms at ownership change. Each such type of context data may also have associated change information.

In an embodiment, a digital twin may store and track other non-physical attributes, such as information about one or more IoT devices, such as readings by IoT sensors (or IoT state information).

Certain terms are used interchangeably herein to describe certain embodiments of the inventive systems, processes, and methods. The use of these terms as referencing particular embodiments or figures should not be construed as limiting the scope of the inventive methods or system. By way of example, the term "entity" may include a distributor, manufacturer, dealer agent, company, third-party maintainer, scrapper, and/or asset custodian. Similarly, the terms digital representation, electronic representation, electronic digital representation, electronic log or simply representation are used to refer to a datafile or non-repudiable log of the asset. Similarly, the term "asset" is intended to cover any relevant product, material, component, equipment or machinery. Further, the term "blockchain" is used herein to refer to any technology that allows for the creation of a non-repudiable transaction log that is resistant to unauthorized alteration and is resilient to failures of any one or more elements in the blockchain system.

Digital Twin Creation

In an embodiment, the digital twin may be created at the same time as the physical asset with similar base features as the initial physical asset.

In another embodiment, the digital twin may be created at a different time than the physical asset (for example, before or after the physical asset). In an embodiment, the digital twin may be created via a preconfigured data representation of a physical asset.

According to an embodiment of the invention, at any given point in time, regardless of when the digital twin and the physical asset are created, the two may be linked. Linking a digital twin and a corresponding physical asset may include, for example, a process by which a data record including or representing the digital twin is modified to refer to unique identifying information of the physical asset.

According to an embodiment of the invention, creating a digital twin generally refers to a computer-implemented process (implemented by executing programming instructions using a processor) by which a digital record comprising the digital twin is created on a non-transitory tangible storage device. In an embodiment, the storage device is physically coupled to the physical asset which the digital twin tracks. In another embodiment, the storage device is decoupled from the physical asset. In a related embodiment, the storage device is a component in a cloud-computing infrastructure available in distributed networks and systems such as the internet or IoT systems. Creating a digital twin may also be described as instantiating the digital twin.

Digital Twins in IoT Environments

A challenge in creating, maintaining, and processing of a digital twin is that the digital twin then grows over time to mimic the physical asset's history; i.e., its experiences and state changes. The digital twin, however, may live on a cloud system or the internet, and can become separated from the physical asset. In other words, the digital twin may not be physically coupled to the physical asset (it is not an "onboard" device). This decoupling presents new and previously unrecognized challenges in so far as users of digital twins cannot trivially and reliably read from or write to a physical asset's digital twin.

For example, consider a physical asset such as a truck whose digital twin is physically decoupled from the physical asset. In this example, the digital twin resides on a cloud computing node (such as a cloud storage device) in a data center, and not on a storage device coupled to the truck. At the time the truck is manufactured, and its digital twin is instantiated, the two may be associated with one another, but they are physically decoupled. However, as physical and non-physical attributes of the truck change over time, the task of reading from and writing to the digital twin record becomes non-trivial and difficult. A technician that changes a part in the truck, for example, cannot directly interact with the digital twin via a physical storage device coupled to the truck.

The task is made more complicated in IoT environments where the physical asset has, or interacts with, IoT sensors that impact or contribute to its physical and non-physical attributes. For example, if an IoT sensor in the truck has a new reading that should be recorded in the truck's digital twin, the prior art is inadequate in its teaching of how to appropriately update the digital twin and track changes to the truck, its parts, or IoT sensors.

Accordingly, novel and non-obvious methods, systems, and computer program products are needed to address the challenges of properly creating, processing, and maintaining digital twins of physical assets in IoT systems or environments.

Physical Asset Management Including Via Blockchain Technologies, FIGS. 1A-6

Some embodiments of the invention will now be described in connection with physical asset management, including via blockchain technologies. Some embodiments will be described more specifically with reference to FIGS. 1-6. However, the designation of these embodiments under a particular section heading should not be considered as limiting the application of the disclosure to only those embodiments. The present disclosure applies equally to other embodiments described under other section headings, as described therein.

Conventionally, secondary customers, technicians, and other downstream asset users may be unaware of the specifications, age, make, model or other asset attributes as this information is not communicated to the customer electronically or may not persist with the asset. Over time, changes are made to configuration of the asset, possibly by dealers or service technicians. Moreover, maintenance may be performed on the asset that affects the overall condition and operating status of the asset. Lack of knowledge of such maintenance history, parts replacement, parts addition, parts operation and configuration changes may lead to unplanned outages and unnecessary repair costs. The maintenance and configuration information is seldom communicated back to the manufacturer for reliability purposes. To date, there is no comprehensive solution to the above problems that has achieved market acceptance.

Thus, improvements are sought in methods for monitoring performance of the asset, lifecycle of the asset, and predictive maintenance for the asset across a broad range of industries. A digital record (for example, a digital twin) may be maintained to monitor various aspects of the asset. The digital record may be built upon an encryption technology, including blockchain technology. The encrypted digital representation of the record makes it highly resistant to hacking or improper alteration—especially as the number of transaction logs, or nodes, increases. The encrypted digital record may further enhance security of the asset.

Blockchain technology is also used for creation, maintenance and administration of crypto-currencies such as Bitcoin. However, use of blockchain technology in Bitcoin, and in other blockchain-based crypto-currencies, creates virtual currencies that have no physical form and are not controlled or valued by a central authority. However, the currently described system and method is specifically used to describe and record information about physical assets. The blockchain encryption technology used to maintain digital record of the physical assets further assures integrity of the record by using an encryption key pair which is accessible by registered authorities.

An embodiment of the invention provides for use of an encryption technology, including in particular, a software encryption technology. The technology may be useful in creating a non-repudiable, and verifiable electronic log of the asset, part and maintenance of the asset. The electronic log is confirmed/affirmed through use of secure identifiers for each users of the system (e.g., each asset maintainers maintains update, modify, or change the asset information when required).

A leading encryption technology is blockchain encryption technology. By way of overview background, a blockchain is an electronic public ledger of transactions. The blockchain or ledger grows as completed blocks are added to the blockchain. The completed blocks correspond to new transactions or events performed on the asset (e.g., maintenance performed). The blocks are added to the blockchain in a linear, chronological order, and only registered agents may add or update transactions to the blockchain.

Upon registration of the asset, an initiator of the blockchain receives a public/private key pair to access a computer client software application. The initiator of the asset may be one of plurality of agents. Although the initiator is provided access to the computer client software application, it is important to note that the client software application need not be resident or operating on the initiator's computer. For example, the initiator may be provided access credentials to the application and the application may be accessed over the internet or other suitable communication network. Each key is uniquely associated to and specifically identifies each asset, and is shared with a plurality of agents authorized to make updates to the record of the asset.

The plurality of agents connect to the blockchain network through the client application (e.g., a software application). The client application validates the agent connections and relays transactions (e.g., maintenance performed) from each agent to the blockchain. The blockchain has complete information about each agent address as well as the registered information about all agents from the first genesis block to the most current completed block. Depending upon rules or policies of the blockchain, the encrypted information may or may not be accessed and read by one or more of the plurality of agents. When parties authorized to handle the assets in the digital representation are registered and all assets are registered, the blockchain provides a complete transaction history of each asset and may provide an account of every asset registered in the encrypted transaction log.

Technology underlying the blockchain enables creation of a non-repudiable, trusted record, even if certain individual parties may not be fully trustworthy. For example, with respect to the encrypted transaction log, in some embodiments, copies of the encrypted transaction log may be distributed among multiple nodes in the blockchain network. Thus, integrity of the transaction log may not be compromised by attacking any single copy of the log. If one copy of the log is improperly altered, it will not match the other copies of the log held by other network nodes. This makes the blockchain highly resistant to hacking or improper alteration—especially as the number of transaction logs, or nodes, increases.

An additional element of the present invention, applicable to some embodiments, is tracking of total log entries of the asset to identify if any updates or changes have occurred on the asset. Another element of the present invention, applicable to some assets or their parts, is serialization of an asset such that each unit or collection of units of the asset is tagged with a unique serial number. Such serialization allows for tracking of an individual asset throughout the performance and maintenance life cycle, in addition to the encryption key.

The asset tag may be any number of technologies such as: a radio frequency identification (RFID) tag, a Near-field Communication (NFC) tag, a Bluetooth® tag, a Quick Response (QR) code, a bar code, a uniform resource identifier (URL), a polyester tag, a bar-code polyester tag, a metal tag, or any tag known in the art.

As described herein, the electronic asset, part, and maintenance log provides a means for recording each change made to the asset, part, and maintenance of the asset, change history, including recording of specifications and identity (e.g., serial number(s)) of each asset in the system.

As part of the initial registration (e.g., by a product manufacturer), and initiation of a blockchain custody log, a description of the product or asset is provided or registered. This initial custody record includes a description of the asset, and any applicable identifying information, including production year, model, configuration, bill of material, diagrams, images, specifications and parts associated with the equipment.

While multiple parties may register assets and initiate a blockchain log, it is important to note that initial registration of the asset creates a beginning point of the asset. More specifically, subsequent updates to the assets are made from the beginning point at which the asset is first registered. In other words, the blockchain asset, part and maintenance log only provides information downstream of the initial asset registration. Information prior to the initiation of the asset, if any, may not be recorded within the blockchain log. While a downstream custodian, for example a distributor may create or initiate a blockchain for the assets it receives if not initiated by the manufacturer, that distributor blockchain may only provide asset, part and maintenance information for those entities downstream of the manufacturer, seller or dealer.

FIGS. 1A and 1B are a system overview in accordance with one embodiment, representing creation of an electronic representation of the asset; the electronic representation may define a digital twin of the physical asset. FIG. 1A shows a plurality of system elements 100 involved in the creation (or updating) process of the digital representation (i.e. Data File) of the asset. FIG. 1B shows a plurality of events that occur during the creation (and/or updating) of the electronic representation of the asset.

With reference to FIG. 1A, the electronic representation of the asset is generated and updated throughout the lifecycle of the asset. Over the lifecycle of the asset, a plurality of parties may be involved in the creation (and/or updating) of the electronic representation of the asset. The parties may include asset dealer 102, asset owner 104, asset manufacturer (not shown), asset manufacturer maintenance service or asset manufacturer warranty service 106, third-party maintenance provider 108 or any other party may be involved in the asset maintenance. The parties may register the asset into a software application provided on a computer server by entering descriptive information and then update the electronic representation of the asset on an event occurrence. The event may be a maintenance event, custody change event, or any other information regarding the asset. Embodiments of the present invention are not limited to but may include any registered party involved in maintenance of the asset. The updates to the asset or asset transactions may be stored in a blockchain repository 110 in the form of a non-repudiable log. The repository 110 may be accessed by the registered parties in order to read or update the asset information.

FIG. 1B shows a plurality of events 200, that occur during creation (and/or updating) of the electronic representation of the asset. A party 201 may register itself in order to receive authorization to initialize a digital representation of an asset, modify the asset specifications, attributes, maintenance information, etc. The party 201 may be but not limited to asset manufacturer, asset distributor, asset dealer, asset owner, asset manufacturer maintenance service, third-party maintenance provider and the like.

At block 202, the asset is registered by a registered party 201 (initial party) in order to initiate a digital representation of the asset. The initial registration of the asset is typically generated by the asset manufacturer and is published along with placement of the asset into a stream of commerce.

At block 204, the digital representation of the asset is optionally updated by the party 201 on the basis of updates to the asset. The updates may be, but are not limited to, changes to asset configuration, asset specification, and other asset information.

At block 206, a maintenance record is maintained for the asset. The maintenance record may be optionally updated by the registered party 201 when a maintenance event occurs. The maintenance event may include but is not limited to: addition of parts to the asset, removal of parts from the asset, replacement of parts on the asset, operating parts of the asset, repairing of asset parts, etc. The maintenance event may also include lubing of asset parts, cleaning of asset parts, refurbishing of asset parts, parts used for maintenance, labor hours consumed, type of maintenance performed, who performed the maintenance, date of maintenance performed, etc.

At block 208, the electronic representation of the asset is optionally updated to reflect part usage information. The asset part usage information may include age of the asset, how much an asset is used, usage rate of the asset, usage history, how frequently the part is used, etc. Over time, parts may fail on the asset and record of failure is useful to the manufacturer, dealers and other users of the asset, e.g., to plan fleet maintenance.

At block 210 of the FIG. 1B, the electronic representation of the asset is optionally updated to reflect the asset part or equipment failure. The part failure data may also include predicted failure rate of the asset and actual failure rate of the asset. The electronic representation is optionally updated based on updates to asset condition. The part failure data may be updated from asset generation, manufacture, or registration to and through asset ownership transfer, sale, use or disposal.

At block 212 and 214, the electronic representation of the asset is optionally updated based on updates to asset end of life, e.g., equipment overhaul, disposal or decommissioning.

FIG. 2 illustrates an example 300 of an asset electronic record and digital information tracking on the asset via blockchain. The asset is tracked in order to ensure integrity of the asset. The asset in accordance with the present invention may be but is not limited to a physical piece of equipment, e.g., an earth mover or a diesel generator. A data file is created using an encryption technology. The encryption technology may be a blockchain technology. The data file may be in the form of a blockchain repository 302. The blockchain repository 302 records and maintains asset specification, asset maintenance information, other asset information and asset part specifications for replicating the asset or asset components on 3D printers.

At block 304, the blockchain repository 302 is initiated for the asset. The initiation may be performed by a manufacturer, dealer, equipment re-seller, or any other person having access to the asset and the blockchain repository 302. The asset initiation requires the asset description to be filled in order to represent the asset digitally.

Original asset digital representation data may include but is not limited to, equipment description, serial number, manufacturer date, equipment attributes, bill of material (parts), recommended maintenance, 3D part specifications, and the like. The digital representation or digital twin record is generated by the asset manufacturer and is populated with relevant asset information, e.g., year, make and model of the asset, as well as relevant specifications, and optionally asset drawings or specifications to replicate parts on a 3D printer.

The blockchain repository 302 may be accessible to only trusted participants in the blockchain. The trusted participants may have access to the asset and asset information in the blockchain repository 302. After initialization, identity of the asset may be encrypted by using an encryption key pair. Participants may register themselves with the blockchain repository in order to access the asset. The participants may register by filling in their credentials in order to authorize themselves for the asset access. A registered participant may register a new participant to the system (or the blockchain repository). The participants may access the asset by using valid credentials. The encryption key may be passed along the blockchain to the trusted participants as the asset data changes. The asset data may change upon a change in asset ownership, asset cost, asset specifications, asset attributes, asset warranty, asset operating status, asset operating conditions, etc. The digital representation of the asset is propagated through the blockchain network as the asset is released to a distributor, dealer, equipment re-seller, or otherwise placed in commerce or use.

The digital representation may be updated to reflect changes in asset ownership, e.g., dealer ownership, purchase by customer, lease, purchase price, and lease price. The digital representation may be updated to reflect asset maintenance performed, e.g., type of maintenance, labor hours, parts used, performed by, and date performed. The digital representation may be updated to reflect asset criticality and reliability data, e.g., part criticality and usage rates, with input from equipment owners, third-party operators, manufacturers, dealers, etc. The digital representation may be updated to reflect asset failure data, e.g., failure type, part/equipment age, failure impact, etc. The digital representation may further be updated to reflect warranty claim data, e.g., claim type, claimed by, claim date, etc. The digital representation may also be updated to reflect change history data, e.g., configuration changes, parts added/removed, etc., by the asset owner, third-party maintainer, dealer service/repair, etc. The digital representation may be updated to reflect operating condition and history data of the asset, e.g., operating condition, date of reported condition, etc. Operating condition data or any other relevant data may be captured and reported automatically by wired sensors or via sensors over wireless protocols. The digital representation of the asset may also be updated to reflect overhaul, decommissioning data or equipment scrap data, e.g., scrap date, scrap value, sold to scrapper, etc.

The digital representation of the asset is updated through the asset lifecycle, e.g., with fields for scheduled maintenance, completed maintenance, replacement or refurbishment of parts, number of cycles or duration of use. The blockchain repository 302 may be updated on change in ownership and purchase costs of the asset at block 306. The ownership of the asset may be purchased by another dealer or another customer. The ownership may be further transferred to a re-seller, serviceman, dealer, third-party maintainer, third-party repairer, supplier, distributor, lessor, technician, broker or customer. Price of the asset may also be updated in the blockchain repository 302. The price update of the asset may be a change in purchase price, lease price, re-selling price, after repair price, etc. The price update of the asset may be made by (new or old) owner of the asset who has access to the asset in the blockchain repository 302.

In addition, the blockchain repository 302 may store maintenance data of the asset at block 308. The maintenance data may comprise maintenance performed on the asset through lifecycle of the asset. The maintenance data may be updated by asset owner, asset re-seller, serviceman, dealer, third-party maintainer, third-party repairer, supplier, distributor, lessor, technician, broker, or customer. The maintenance data may comprise adding parts to the asset, removing parts from the asset, replacing asset parts, operating asset parts, maintenance history or any configuration changes for the asset. The maintenance data may further include but is not limited to type of maintenance performed, labor hours spent on the asset maintenance, parts used for the maintenance, who performed the maintenance, date of maintenance performed on the asset. The maintenance data is updated in the blockchain repository 302 by the trusted participant. The repository 302 may also include manufacturers recommended maintenance and actual maintenance performed on the asset.

Further, the blockchain repository 302 comprises criticality and reliability data of the asset at block 310. The criticality and reliability data of the asset may include usage rate of the asset. The asset criticality may depend upon parts used in the asset. The parts of the asset may have a higher quality by being manufactured by renowned brands. The parts may have a lower quality in order to reduce cost of the asset. Thus, the criticality of the asset further affects reliability of the asset. The asset reliability also comprises usage rate of the asset which may help in predicting the life of the asset.

The blockchain repository 302 maintains asset failure data at block 312. The failure data may comprise type of failure of the asset or impact of the failure on the asset. The failure data may also comprise failure prediction data. The failure prediction data may help owner of the asset to predict a lifetime of the asset or predicting a required maintenance. The asset failure prediction may be based upon asset history, type of parts used in the asset, past maintenance performed on the asset, type of maintenance performed on the asset, parts replaced, operated, repaired in the asset, etc. The asset failure data may also be predicted from the age of asset and age of parts used in the asset. The asset failure data may further depend upon the type of parts used in the asset, i.e., asset criticality and reliability data. The asset failure data may also comprise a record of past failures of the asset. The failure data may be updated by the trusted participant having access to the asset.

At block 314, warranty claims of the asset are updated in the blockchain repository 302. The warranty claims of the asset may be updated by manufacturer of the asset or a dealer of the asset. The warranty claims may comprise claim type, claimed by or claim date of the asset. The claim type may include parts of the asset falling under the asset warranty, amount of damage that may be claimed, type of damage that may be claimed, etc. The warranty claims may also include nominees of the claim in order to specify who may ask for the claim. The warranty data further includes duration of the warranty or date till which the nominee may claim the warranty.

At block 316, history of the asset may be updated in the blockchain repository 302. The history change may reflect configuration change of the asset, parts change, parts added, removed, replaced or operated in the asset. The asset configuration may include various factors which may be software parameters that may affect working of physical parts of the asset. The configuration change may include, e.g., revolutions per minute RPM value, total hours of operation, crude oil consumption, power consumption, pressure or coolant amount, etc. Change in parts of the asset may also be maintained in the blockchain repository 302. The parts change may be addition of parts to the asset, removal of parts from the asset, part maintenance, etc. The parts change may also reflect changing part specifications such as operating temperature, operating conditions, operating status, etc.

With reference to FIG. 2, operating conditions and history of the asset may be updated at block 318. The operating conditions may be updated on the basis of sensor data. The operating conditions may include but are not limited to operating temperature, heat, frequency and power. History of the asset may include report of previous operating conditions of the asset. The history may also include the dates of the reported conditions of the asset. The operating conditions of the asset or various parts of the asset may change with usage, age, operating environment of the asset. The asset operating conditions and history may be maintained by the asset owner, manufacturer, third-party maintainer, dealer, serviceman or repair person.

At block 320, the asset information regarding overhaul, decommission, scrap may be updated in the blockchain repository 302. The overhaul data may include, but is not limited to, date, event type, scrap value or information of scrap receiving party. The information may be updated by the asset owner, dealer or asset re-seller.

FIG. 3 is an example of a report 400 generated from information gathered by a system over lifecycle of the asset. The report 400 is maintained and updated in order to ensure integrity of asset digital representation. The system may comprise a plurality of terminals in a computer server where each of the plurality of terminals may be associated with one or more plurality of agents. The computer server operates a software application for performing a method to track and record information of the asset by using an encryption technology. The encryption technology may be a blockchain technology. A plurality of agents may be registered within the software application. The registration of the plurality of agents may require the agents to fill in descriptive information into the blockchain about themselves that may specify identity of each agent. Each registered agent is provided with a unique encrypted identifier that may be used to access the asset representation and asset information. An initial agent may register the asset into the blockchain by specifying the identity of the asset. The initial agent may be one of the plurality of registered agents. Identity of the asset and identity of the agent may be encrypted into a non-repudiable log. The initial agent may be a manufacturer, dealer, supplier, seller, distributor, owner, lessor, serviceman, technician, broker or customer.

Registration of the asset may be performed by filling descriptive specifications of the asset. The asset registration is the start of the blockchain encrypted non-repudiable log as shown in FIG. 3 by Log 1. The specifications of the asset may include, but are not limited to, year of manufacture, model number, age, color, series, asset diagrams, asset images and parts of identity associated with the asset. The asset specifications may also include asset description, serial number of the asset, manufacture date of the asset, asset attributes, bill of material or parts of the asset, recommended maintenance for the asset, 3D part specifications, etc.

One example of the asset is an earth mover which has the specifications as 123456, Nov. 1, 2016, Yellow|150 HP|front loader, 123|124|125|126|127; 501,502,503|oil change every 1000 hours. The asset specification may be filled by owner of the asset, asset manufacturer, asset dealer, asset third-party service, etc.

Further, updates to the asset information may be performed by the plurality of registered agents by using the encrypted identifier allotted to the agents. At least one of a plurality of agents working on the asset may register a maintenance event occurred on the asset into the non-repudiable log by using the encrypted identifier. The at least one of a plurality of agents may also add a record of the maintenance event to the non-repudiable log. The non-repudiable log records and maintains asset specification, asset maintenance information, bill of material or parts used in the asset, history of bill, history of parts used, asset history, asset warranty, other asset information and asset part specifications for replicating asset parts on 3D printers.

Replicating asset parts on 3D printers may be used to form a 3D model of the asset or asset components by using asset specifications.

As shown in FIG. 3, an electronic log/representation 400 for a physical asset, e.g., an engine, transmission, or hydraulic pump, is generated, updated and tracked via blockchain. The digital representation of the asset is initially populated by the manufacturer and updated as the asset moves in commerce (e.g., transit, warehousing, distribution, purchase) or in the field (e.g., shipping, installation, configuration, calibration, in-use, updates, maintenance, refurbishment, replacement, decommissioning, and the like). Part changes, part failures, sensor readings, maintenance, and the like are tracked and reported in the non-repudiable log. The non-repudiable log may include various logs maintained to track the asset information in accordance with various aspects. Log 2 maintains aftermarket parts added to the asset by dealer, re-seller-third-party service, etc. An example of the Log 2 may be Hydraulic Front Loader, 80010|GPS tracking unit, 53020. The Log 2 may also record parts added to the asset, parts removed from the asset, parts operated in the asset, parts replaced in the asset, etc. 1. In some embodiments, the asset is a mining asset, an oil & gas asset, a transportation equipment, public transit equipment, manufacturing asset, or a utility asset digital representation. In some embodiments, the asset is a proprietary, confidential or classified document in a chain of custody. In some embodiments, the system is implemented for determining at least one of the legitimacy of a claim and the authority of a claimant to authorize an action to the asset.

Moreover, a Log 3 as shown in FIG. 3 maintains maintenance events of the asset. The maintenance event may include type of maintenance, labor hours, parts used in maintenance, who performed the maintenance, date on which the maintenance is performed. The type of maintenance may be oiling of components of the asset, greasing of components, brushing, dust removal, change of oil, filter cleaning, etc. The labor hour record may maintain hours spent by the labor during maintenance. Record of the parts used in maintenance may comprise type of parts used, number of times the parts were replaced on the asset, age of parts, etc. The log 3 also maintains record of details of person performing maintenance on the asset. The log 3 keeps record of administrative information of person performing the maintenance. Date of maintenance is also recorded in order to predict certain aspects of the asset such as failure, usage rate, recommended maintenance, actual maintenance, etc. An example of Log 3 record may be:

1000-hour maintenance|1.5 HR|Oil:801,Filter:802, Grease:803|Company repair tech Jim Smith|Dec. 1, 2016.

In addition, a Log 4 is maintained to record asset failure data. The failure data may be predictive failure data or actual failure data for the asset. Failure is predicted from history of the asset maintenance such as parts replaced, type of parts replaced, usage rate of the parts of the asset, brand or company of the parts used in the asset, parts expiration, etc. On the basis of parts used in the asset, a failure of the asset is predicted by owner, dealer, manufacturer, customer, re-seller of the asset. The failure is predicted in order to notify or alert customer or owner of the asset regarding asset maintenance and conditions. The actual failure of the asset is also recorded. The actual failure of the asset may happen at the same time as the prediction, before the prediction or even after the prediction of the failure. The difference between actual failure and the predicted failure may not exceed a certain predetermined time limit. The amount of actual failure happened to the asset or type of the asset failure must also fall under or within certain limits of the predicted failure data. The failure data may be recorded from sensor readings. The type of failure happened to the asset is tracked and recorded along with a certain code specifying the failure type. The system may also keep record of date of the predicted failure and actual failure. Efforts are made in order to minimize the difference between failure prediction and actual failure. An example type of failure record may be:

Sensor|Failure Code|Failure Date
    Engine Temperature|EN010|Dec. 2, 2016

Log 5 as shown in the FIG. 3 keeps record of a warranty claim for the asset. Warranty claim of the asset is updated and maintained by either manufacturer of the asset or dealer of the asset. The warranty claim may include claim type, claim ID, claimed by or claim date of the asset. The claim type may include parts of the asset falling under the asset warranty, amount of damage that may be claimed, type of damage that may be claimed, etc. The claim type may comprise the part of the asset that may be claimed such as engine, chassis, cylinders, etc. The claim ID of the asset is related to the claim type. Each part of the asset may have a particular claim ID in order to keep record of claim duration, claim amount, or claim criteria for the part. The warranty claim may also include nominees of the claim in order to specify who may ask for or make a claim. The nominee of the claim may be owner of the asset, customer of the asset, a company or organization associated with the asset. The asset may have different parts added to it and the parts may be manufactured by different companies and organizations. Thus, the warranty claim for each asset part may vary according to the asset type and manufacturing. The customer of the asset may approach the respective manufacturing organization of the asset part in order to access the warranty claim. The warranty data further includes duration of the warranty claim or date till which the nominee may claim the warranty or date of the claimed warranty. An example of the warranty claim may be:

Claim Type|Claim ID|Claimed By|Claim Date
    Engine|80202|Company xxxx|Dec. 3, 2016

The non-repudiable log further maintains and records part criticality in Log 6 as shown in FIG. 3. The criticality and reliability data of the asset may include usage rate of the asset. The asset criticality may depend upon parts or sub-parts used in the asset. The parts of the asset may have a higher quality or a lower quality corresponding to a cost of the asset. Thus, the criticality of the asset may further affect reliability of the asset. The asset reliability also comprises usage rate of the asset which may help in predicting the life of the asset. The asset failure also depends upon type of parts used in the asset, i.e., asset criticality and reliability. The criticality data may be for example:

Subassembly: part|MTBF|MTTR
    Engine: Gasket 11000 HR|5 HR

History of the asset and its parts is tracked in Log 7 over the lifetime of the asset. The asset history may include type of change performed on the asset. The type of change may include whether various parts are added to the asset, parts are removed from the asset, parts are operated on the asset, parts are replaced in the asset, parts are repaired in the asset, etc. The history may further record a name of the part that is added, removed, operated or replaced in the asset. Part ID of the part added, removed, operated or replaced is also recorded in the log. The date on which the change is made to the asset is also stored to help in keeping record of age of a part, predicting failure of the part, tracking usage rate of the part, etc. In addition, the history log, Log 7 may also record quantity of the change made to the parts of the asset, for example how many parts are added, removed, replaced or operated on the asset. An example history log may be:

Change type|Part name|Part ID|date installed|Qty
Add part|Vibration Sensor|003030|Dec. 10, 2016|1

The non-repudiable log 400 comprises a Log 8 including a log of operating conditions of the asset. The log 8 records and tracks initial operating conditions, operating status, change in operating conditions with time for the asset. The operating conditions may further be in relation to various parts of the asset. The operating conditions may specify vibration, temperature, operating pressure, frequency, revolutions per minute, crude oil consumption, operating environment, etc. Each operating parameter may have a particular value stored in the log and the operating value may be updated by manufacturer of the asset, dealer, re-seller, owner, customer, third-party service, repairer, etc. The log 8 also comprises date on which the operating condition is stored. An example of the log 8 may be:

Condition|Condition Value|Date
Vibration|0.05|Dec. 15, 2016

The non-repudiable log 400 further comprises a Log 9 in order to store and track overhaul or decommission asset data. The log 9 includes asset overhaul and disposal data. The digital representation may be updated to reflect overhaul, decommissioning data or asset scrap data, e.g., scrap date, scrap value, sold to scrapper, etc. The Log 9 may be updated and tracked by asset owner, dealer or re-seller of the asset. An example of Log 9 may be:

Event|Date
Overhaul|Nov. 17, 2017

The non-repudiable log 400 may be transmitted to the registered agents having access to the asset information. The log 400 may also be transmitted to agents or parties which are not a member of log 400 and do not have access to change or update the asset information. However such parties may have access to read and note the asset information such as in case a party is willing to buy the asset, the party may read the asset information but cannot change or update any data related to the asset. The non-repudiable log 400 may have administrative information related to agents or parties having access to the log 400. The log 400 comprises record of each asset change from asset manufacture or registration to and through asset final transfer, sale, during its use or upon its disposal.

Figures 4, 5:
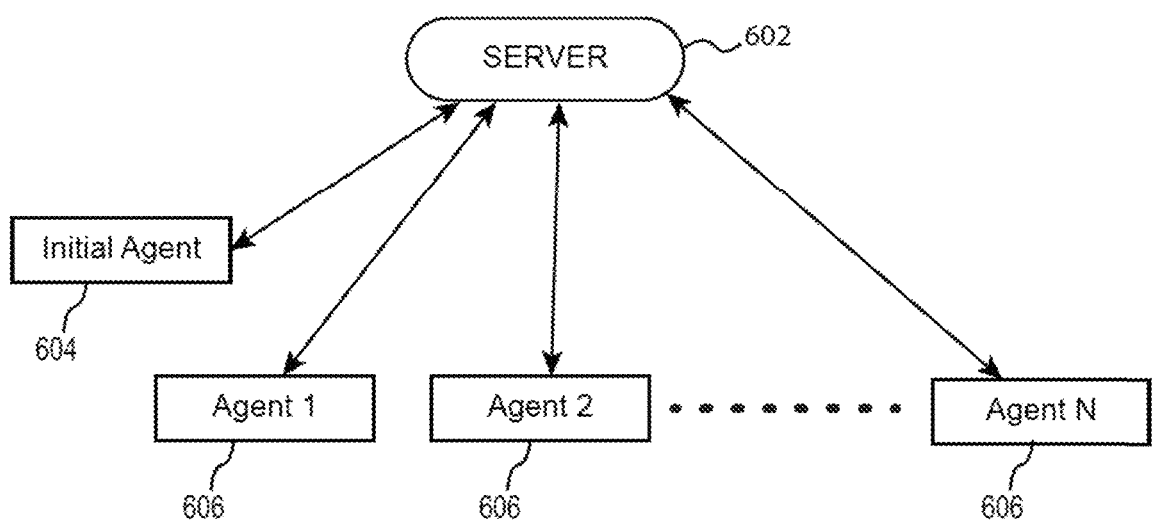
FIG. 4 is an exemplary illustration showing types of reports generated using the information gathered by the system over lifecycle of the asset.
FIG. 5 is an overview illustration showing a network of asset management systems.

FIG. 4 is an exemplary illustration showing types of reports 500 generated using the information gathered by the system over lifecycle of the asset. The embodiments of the present invention may comprise but are not limited to five types of reports that may be generated by using information of the asset through its lifetime. With reference to FIG. 4, a set of standard reports may be generated by the system. Asset digital representation reports may be generated to document certain details regarding the digital representation of the asset and/or any activity within the digital representation of the asset. Example of Asset digital representation reports may include:

Report 1—Asset Details
Report 2—Warranty History
Report 3—Failure History
Report 4—Maintenance History
Report 5—Part Usage History Report 1 comprising asset details may include various details of the asset. The asset details in accordance with the present invention may include, but are not limited to, asset description, serial number of the asset, manufacturing date of the asset, asset attributes, bill of material, asset parts, maintenance data, asset part specifications which may be used to represent 3D model of the asset. The asset details may also include operating condition of the asset or operating status of the asset. The asset specifications may further include year of making of the asset, model number, age, color, asset diagrams, asset images, asset parts or identity of the asset.

Report 2 comprises warranty history of the asset. warranty claim may include claim type, claim ID, claimed by, or claim date of the asset. The claim type may include parts of the asset falling under the asset warranty, amount of damage that may be claimed, type of damage that may be claimed, etc. The claim type may comprise the part of the asset that may be claimed such as engine, chassis, cylinders, etc. The claim ID of the asset is related to the claim type. Each part of the asset may have a particular claim ID in order to keep record of claim duration, claim amount, claim criteria for the part. The warranty claim may also include nominees of the claim in order to specify who may ask or claim for the claim. The nominee of the claim may be owner of the asset, customer of the asset, a company or organization associated with the asset. The asset may have different parts added to it and the parts may be manufactured by different companies and organizations. Thus, the warranty claim for each asset part may vary according to the asset type and manufacturing. The customer of the asset may approach the respective manufacturing organization of the asset part in order to access the warranty claim. The warranty data further includes duration of the warranty claim or date till which the nominee may claim the warranty or date of the claimed warranty. An example of the warranty claim may be:

Claim Type|Claim ID|Claimed By|Claim Date
Engine|80202|Company xxxx|Dec. 3, 2016

Report 3 comprises failure history for the asset. The failure history may include failure prediction data and actual failure data for the asset. Failure is predicted from history of the asset maintenance such as parts replaced, type of parts replaced, usage rate of the parts of the asset, brand or company of the parts used in the asset, parts expiration, etc. On the basis of parts used in the asset, failure of the asset is predicted by owner, dealer, manufacturer, customer, re-seller of the asset. The failure is predicted in order to notify or alert the customer or owner of the asset regarding asset maintenance and conditions. The actual failure of the asset is also recorded. The actual failure of the asset may happen at the same time as the prediction, before the prediction or even after the prediction of the failure. The difference between actual failure and the predicted failure must not exceed a certain time limit. The amount of actual failure happened to the asset or type of the asset failure must also fall under or within certain limits of the predicted failure data. The failure data may be recorded from sensor readings. The type of failure happened to the asset is tracked and recorded along with a certain code specifying the failure type. The system may also keep record of date of the predicted failure and actual failure. Efforts are made in order to minimize the difference between failure prediction and actual failure.

Report 4 comprises maintenance history of the asset. The maintenance history of the asset may include various maintenance events of the asset. Maintenance events may include type of maintenance, labor hours, parts used in maintenance, who performed the maintenance, date on which the maintenance is performed. The type of maintenance may include oiling/greasing of components of the asset, cleaning of components, brushing, dust removal, change of oil, filter cleaning, etc. The labor hour record may maintain hours spent by the labor during maintenance. Record of the parts used in maintenance may comprise type of parts used, number of times the parts were replaced on the asset, age of parts, etc. Report 4 also maintains record of details of person performing maintenance on the asset. Record of administrative information of person performing the maintenance is also maintained. Date of maintenance is also recorded in order to predict certain aspects of the asset such as failure, usage rate, recommended maintenance, actual maintenance, etc.

Report 5 comprises part usage history of the asset. Various parts of the asset are tracked, their operating conditions, operating status, sensor readings are recorded in form of digital representation in report 5. Part criticality or reliability data is also maintained. Usage rate of the asset is also stored in the report. The asset usage rate may help in predicting failure rates of the asset. The asset usage rate also helps the manufacturer of the asset to recommend maintenance for the asset. The recommended maintenance and actual maintenance data is stored in the report 4 as discussed in the previous section.

FIG. 5 is an overview illustration showing a network of asset management system. The network 600 comprises a server 602 that may be connected to a plurality of agents 606. The agents 606 may register themselves in order to access the asset information (or digital representation of the asset). The agent registration may include filling in valid credentials by the agents 606 into a blockchain. The registration of the plurality of agents 606 may require the agents to fill in descriptive information into the blockchain about themselves that may specify identity of each agent. Each registered agent is provided a unique encrypted identifier that may be used to access the asset and asset information. An initial agent 604 may register the asset into the asset management network by filling in required descriptive information of the asset. The initial agent 604 may be at least one of the plurality of agents 606 or the initial agent 604 may be a separate entity, not a member of the asset management network. Identity of the asset and identity of the agent may be encrypted into electronically encrypted record. The initial agent 604 may be a manufacturer, dealer, supplier, seller, distributor, owner, lessor, serviceman, technician, broker or customer.

Further, the plurality of agents 606 and the initial agent 604 may be connected to each other via the server 602. The connection between the agents 604, 606 is in such a way that each agent may have access to read the asset information. Any update to the asset information is communicated among each of the agents 604, 606. Each agent may also keep a record of the asset. Update to the asset at one agent may lead to change in record of the asset kept by every other agent. Such a network helps in ensuring integrity of the asset by preventing any fraudulent change to the asset information by non-trustworthy agents. Because of technology underlying the blockchain, a non-repudiable, trusted record is created, even if certain individual agents may not be fully trustworthy. Copies of the encrypted record are distributed among multiple nodes in the blockchain network, the integrity of the encrypted record cannot be compromised by attacking any single copy of the encrypted record. If one copy of the encrypted record is improperly altered, it will not match the other copies of the encrypted record held by other network nodes. This makes the blockchain network highly resistant to hacking or improper alteration—especially as the number of transaction logs, or nodes, agents increases.

Figure 6:
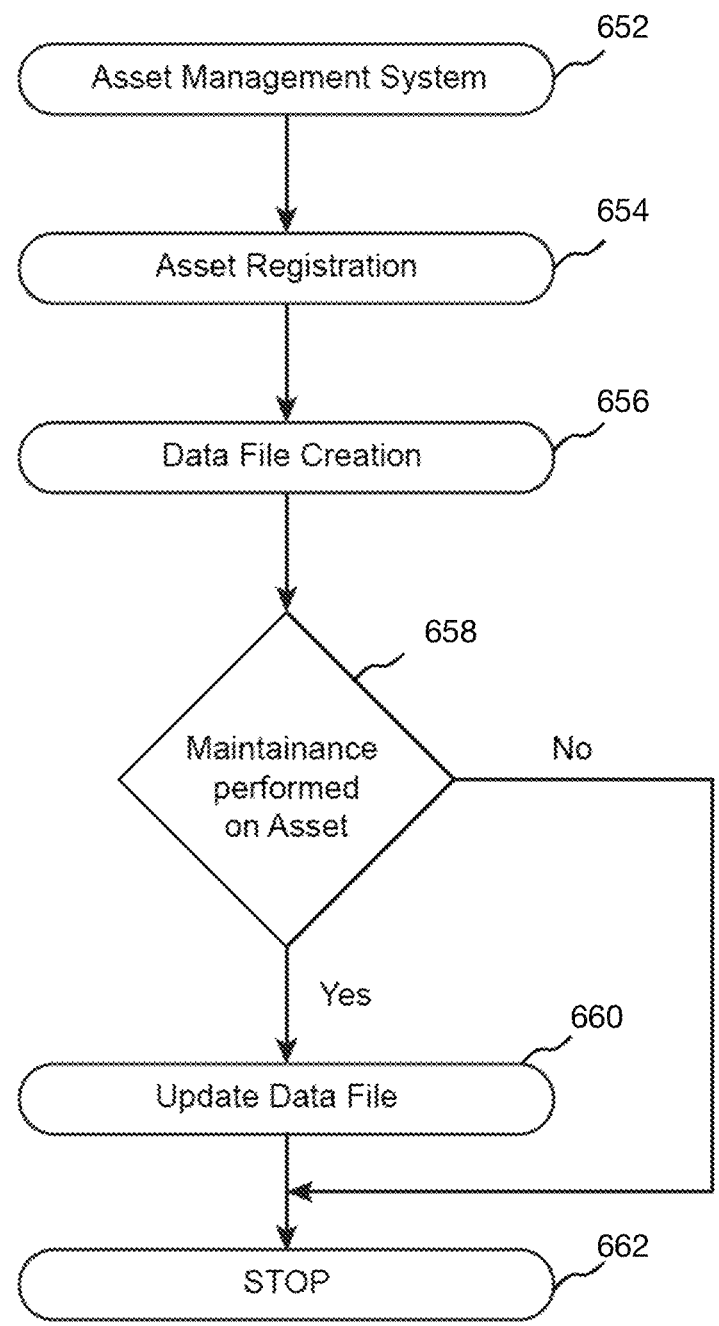
FIG. 6 is a flowchart illustrating process flow of the asset management system.

FIG. 6 is flowchart illustrating process flow in asset management 650. The process flow starts at step 652 where an asset management system is initiated to perform a method using encryption technology to record and maintain asset specification, parts, bill of material, recommended maintenance, warranty, actual maintenance performed on the asset, etc. The initial step 652 also requires at least one custodian of the asset to register themselves into the system for performing maintenance and configuration changes to the asset within a software application. The custodian may register themselves by providing descriptive information about themselves in the system that may specify identity of the custodian. The registered custodian is provided a public/private key pair to access the asset. Each registered custodian may have a unique identifier specifying identity of the custodian and the unique identifier is used to access the asset.

An initial custodian may register the asset at step 654. The asset registration may include filling in descriptive information of the asset by the initial custodian. Filling in the descriptive information of the asset leads to initiation of a blockchain custody log. The asset description may include but is not limited to asset specifications, bill of materials, bill of parts of the asset, attributes or configuration information of the asset. The asset registration creates a beginning point of the asset. The initial custodian registering the asset may be one of the registered custodians. In another embodiment of the invention, the initial custodian registering the asset may not be one of the registered custodians. The initial custodian may be a manufacturer of the asset, dealer of the asset, owner of the asset, re-seller of the asset, customer of the asset, etc. The asset specification in accordance with the embodiment of the invention may include, but is not limited to, year of manufacture of the asset, model number of the asset, age of the asset, operating conditions of the asset, etc.

At step 656, with reference to FIG. 6, a data file is created using an encryption technology. The encryption technology may be a blockchain technology. The data file comprises all the information of the asset as well as information related to custodians of the asset. The data file is maintained and updated by the registered custodians using blockchain encryption technology. The data file keeps detailed information of the custodians involved in the asset maintenance that may comprise their name, role, identity, address, etc. The data file also keeps record of the asset information such as asset specifications, asset description, asset maintenance record, record of parts of the asset, asset attributes, asset configuration, asset bill, material, asset history, asset warranty, asset failure record, asset part usage record, etc. The data file may be accessed by only authorized parties to change the asset information. The authorized parties may have an encryption key pair unique to every asset to maintain and update the asset information.

At step 658, it is checked whether maintenance is performed on the asset or not. If maintenance is performed on the asset, the process flow moves to step 660, otherwise, if maintenance is not performed on the asset, the process flow moves to step 662. The maintenance performed on the asset may include change in parts of the asset such as adding parts to the asset, removing parts from the asset, operating parts of the asset, replacing parts of the asset, or repairing asset parts. Maintenance may also comprise changing oil, greasing, lubricating, filter cleaning, tire change, or any other type of maintenance.

At step 660, with reference to FIG. 6, the data file is updated in case a maintenance is performed on the asset. The registered custodians may use the encryption key pair to update and change the asset information. The custodians update the data file to track and record asset changes. The data file may be updated to change part information, change asset specification information, update asset part configuration, bill of parts used in the asset, update material used in asset or its parts, updating reliability and criticality of the asset, maintaining history of the asset, recording data related to labor used to maintain the asset, date of maintenance, etc. Asset history may record each part of the asset with its age, company, reliability, brand, manufacturing organization, usage rate of the part of the asset, etc. The labor data recorded in the data file may comprise name of the person, organization, company or any other entity performing asset maintenance of asset and asset parts. The data file may include administrative information of the person, organization, company or any other entity performing asset maintenance that may include role, authority, etc. of the entity. The data file may also record a new custodian performing maintenance on the asset and asset parts.

Further, the data file may also be transmitted to other custodians for updating their individual records regarding asset information. The data file may also keep a record of history of the custodians of the asset along with their personal and professional details. The data file also records warranty history of the asset, failure history of the asset, maintenance history of the asset and part usage history of the asset.

In case, it is determined that no maintenance is performed on the asset at step 658, the process flow moves to step 662, where the record keeping and data file updating is completed for the asset.

Digital Twins in IoT Environments, FIGS. 7-10

Additional embodiments of the invention will now be described in reference to the use of digital twins of physical assets in IoT systems and IoT environments. Embodiments herein may be the same as, similar to, or work in conjunction with additional embodiments of the invention described above in connection with FIGS. 1-6. These additional embodiments are described under the heading Digital Twins in IoT Environments, FIGS. 7-10 for illustrative purposes. Therefore, this designation should not be read to limit the scope of the present invention; rather, the scope of the invention is defined by the claims.

Figure 7:
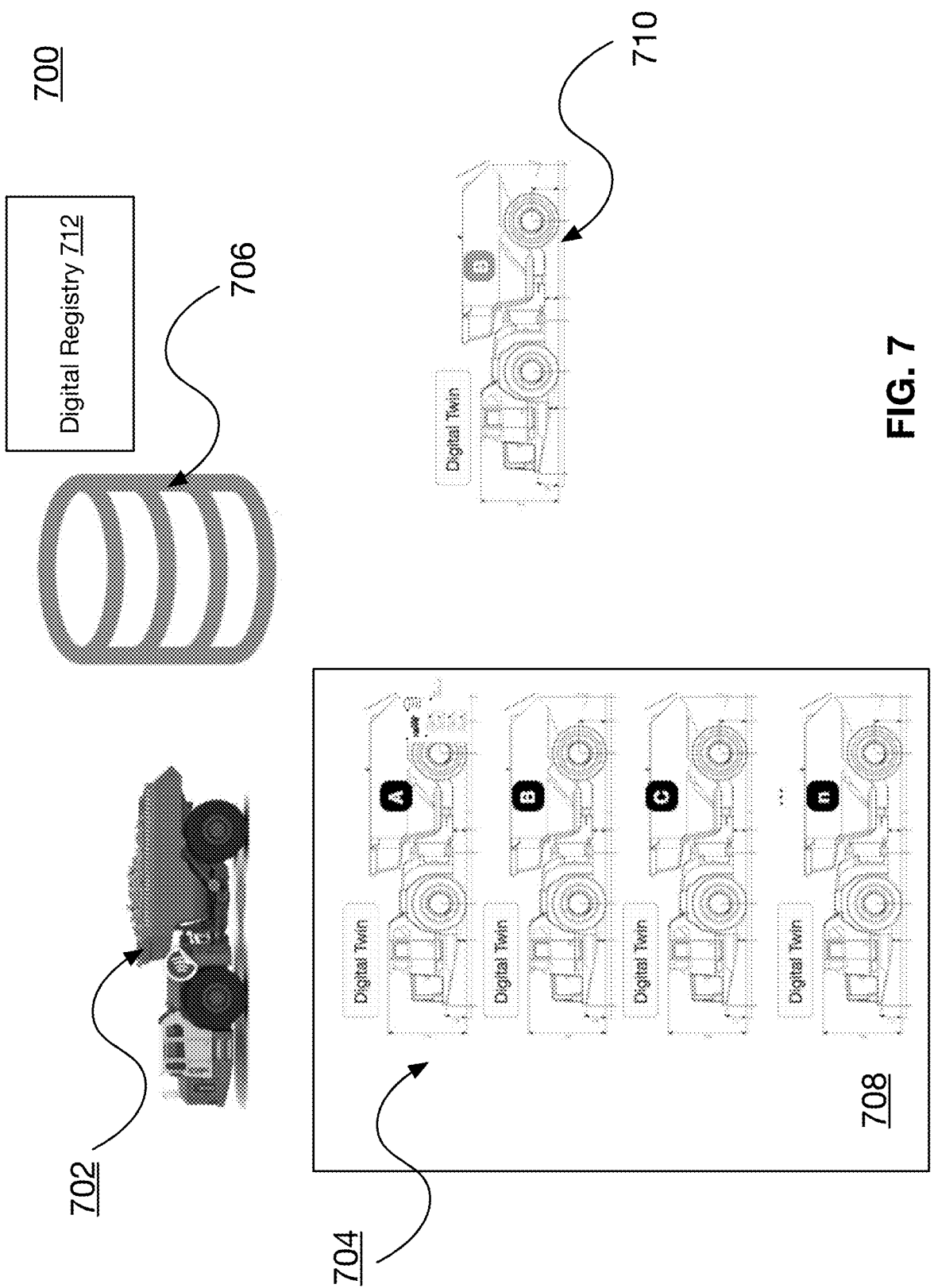
FIG. 7 is a block diagram of an illustrative Internet-of-Things (IoT) environment including a physical asset and digital representations of physical assets, according to an embodiment of the invention.

FIG. 7 is a block diagram of an illustrative Internet-of-Things (IoT) environment 700 including a physical asset and digital representations of physical assets, according to an embodiment of the invention.

Referring now to FIG. 7, IoT environment 700 includes one or more physical assets 702, one or more digital representations 704 of the one or more physical assets 702, a first digital storage device 706 storing a digital registry 708 and digital representation 704, and one or more retrieved digital representations 710 of physical assets 702. IoT environment 700 may be referred to an IoT system in so far as the environment comprises a system of at least some distinct but functionally communicative devices.

A physical asset 702 generally may be any physical asset as described in the present disclosure under the heading Definitions, and in connection with FIGS. 1A-B and 2. A given physical asset 702 may comprise an IoT device. For example, in FIG. 7, a truck is shown including a wireless symbol denoting its communicative properties, which may be provided by a wireless transmission device or one or more IoT sensors.

First storage device 706 may be any tangible storage device for storing computer data. In an embodiment, first storage device 706 stores digital registry 708 and digital representations 704. In another embodiment, digital registry 708 is stored on a different storage device than digital representations 704. IoT environment 700 may include additional storage devices such as a second storage device (not shown). The additional storage devices may store different sets of digital representation 704 data, or copies thereof. Each of the stored data sets described here may be, in some embodiments, distributed among one or more storage devices.

Digital registry 704 may be stored on first storage device 706, and may contain one or more (and in practice, hundreds of thousands or more) digital representations 704 of physical assets 702, such as Digital Twins A, B, C, . . . n. In an embodiment, digital representations 704 may also be referred to as digital twins.

For a given physical asset 702, such as the truck shown in FIG. 7, embodiments of the invention may read from, write to, copy, delete, or move retrieved digital representation 710. In the example shown in FIG. 7, retrieved digital representation 710 may be Digital Twin B, identified or retrieved from the set of Digital Twins A . . . n in digital registry 704.

Digital registry 708 may include one or more data records, where each such data record may correspond to a digital representation 704. The data record may have at least two fields, including a unique identifier and a location (a storage location) of digital representation 704 of physical asset 702. In the example depicted in FIG. 7, where Digital Twin B is the digital representation 704 of the truck; a digital record for the truck may include a unique identifier (such as an ID number) of Digital Twin B, and an internet protocol address for first storage device 706 which stores Digital Twin B. In the event that Digital Twin B resides on (or is copied or moved to) a second storage device, the digital record can be updated to refer to the location information for Digital Twin B in the second storage device. The unique identifier may be stored as an encrypted value.

IoT environment 700 and its various components will now be discussed in more detail in connection with methods 800 and 900 (FIGS. 8A-E and 9), in accordance with embodiments of the invention.

Accordingly, FIGS. 8A-E are flowcharts depicting illustrative steps of a method 800 for managing a digital representation 704 of a physical asset 702, as described in connection with FIGS. 1, 2, and 7, according to embodiments of the invention. Steps of methods 800 and 900 may be carried out by executing, via a processor of a computer device (such as cloud computing node 10 of FIG. 11), one or more programming instructions stored on a tangible storage device. Some flowcharts in these figures are described as a flow, such as flow "A" or "B". The particular flows described are for illustrative purposes only and should not be construed so as to limit the scope of the claimed invention. For example, steps of any given method may be provided in a different order, at different times, and in different iterations, than those explicitly depicted in the figures.

Figure 8A:
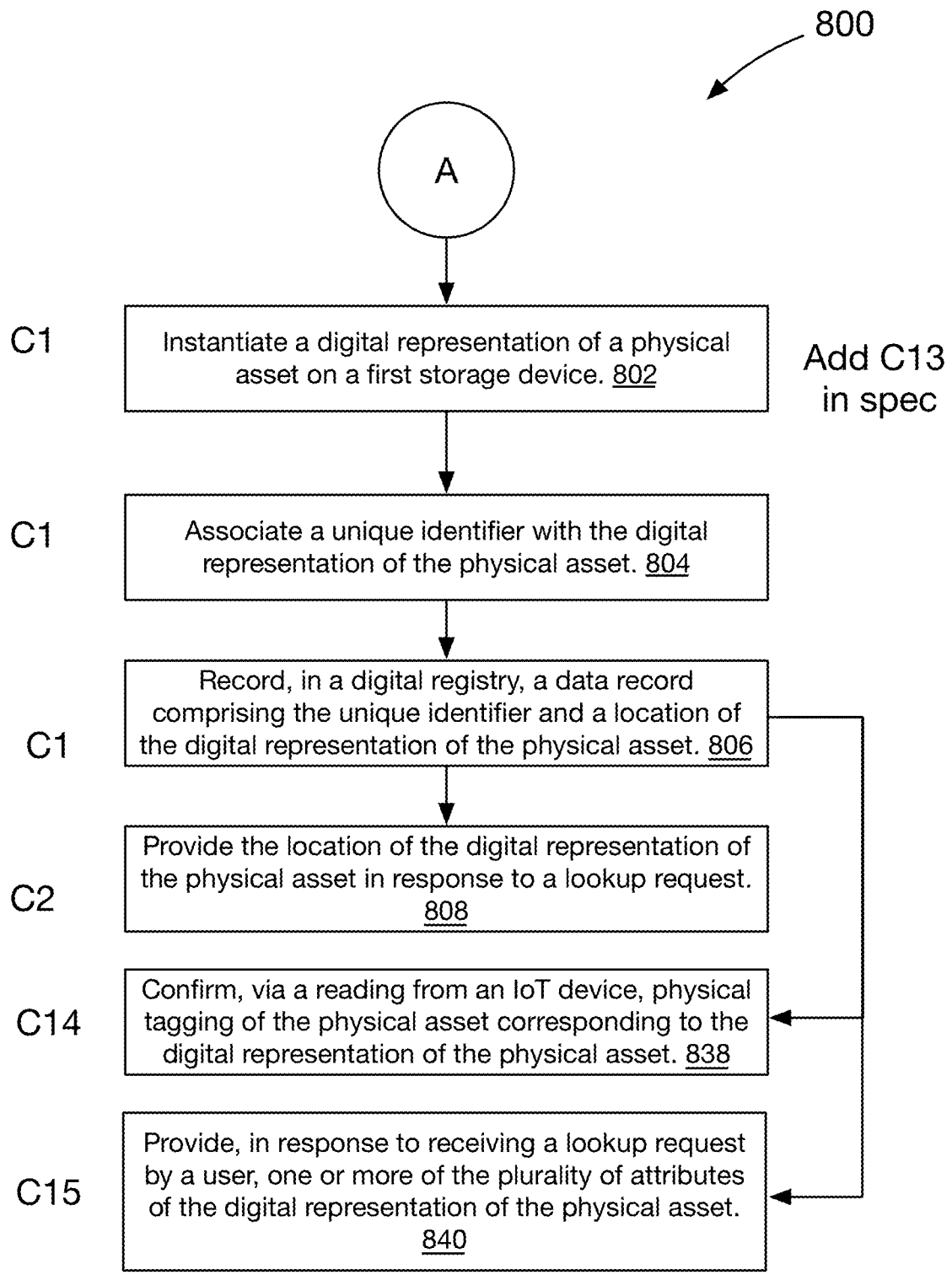
FIGS. 8A-E are flowcharts depicting illustrative steps of a method 800 for managing a digital representation of a physical asset, according to embodiments of the invention.

Referring now to FIGS. 7 and 8A, method 800 for managing a digital representation 704 of a physical asset 702 executes according to flow "A", and instantiates (step 802) a digital representation 704 of a physical asset 702 on a first storage device, such as first storage device 706. Digital representation 704 has a plurality of attributes (not shown). For example, the method instantiates Digital Twin B. Instantiation generally may refer to creating a digital twin record in accordance with processes described in connection with FIGS. 1 and 2, above (for example, at element 202).

In an embodiment, the plurality of attributes may include one or more of the following, which, in an embodiment, may have initial values. In an embodiment, initial values of the plurality of attributes of digital representation 704 of physical asset 702 may be defined using one or more data fields of a digital agreement record. An example of fields of a digital agreement record are provided below and in TABLE 1: a user manual data field, a bill of material data field, a warranty bulletin data field, a warranty claim data field, a maintenance plan data field, a maintenance history data field, a part replacement data field, a part usage data field, a physical asset specification data field, a 3-dimensional model data field, a computer-aided design data field, a fault code data field, a scheduled maintenance data field, an operating manual data field, an Internet-of-Things (IoT) sensor reading data field, an artificial intelligence model data field, a data prediction model data field, an operating history data field, an ownership data field, and a change in ownership data field.

TABLE 1

Figure 12:
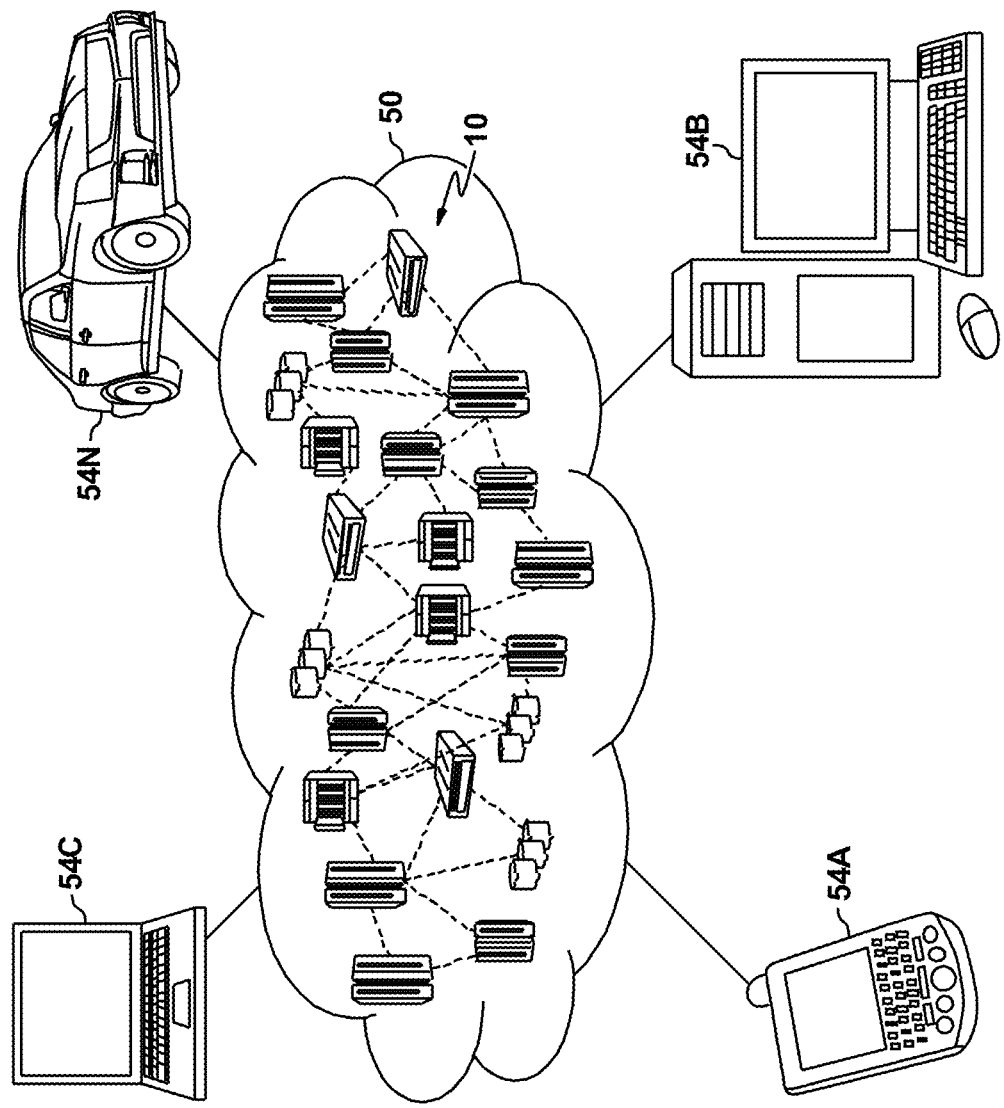
FIG. 12 is a block diagram of a cloud computing environment including the cloud computing node of FIG. 11, according to an embodiment of the invention.
Figure 13:
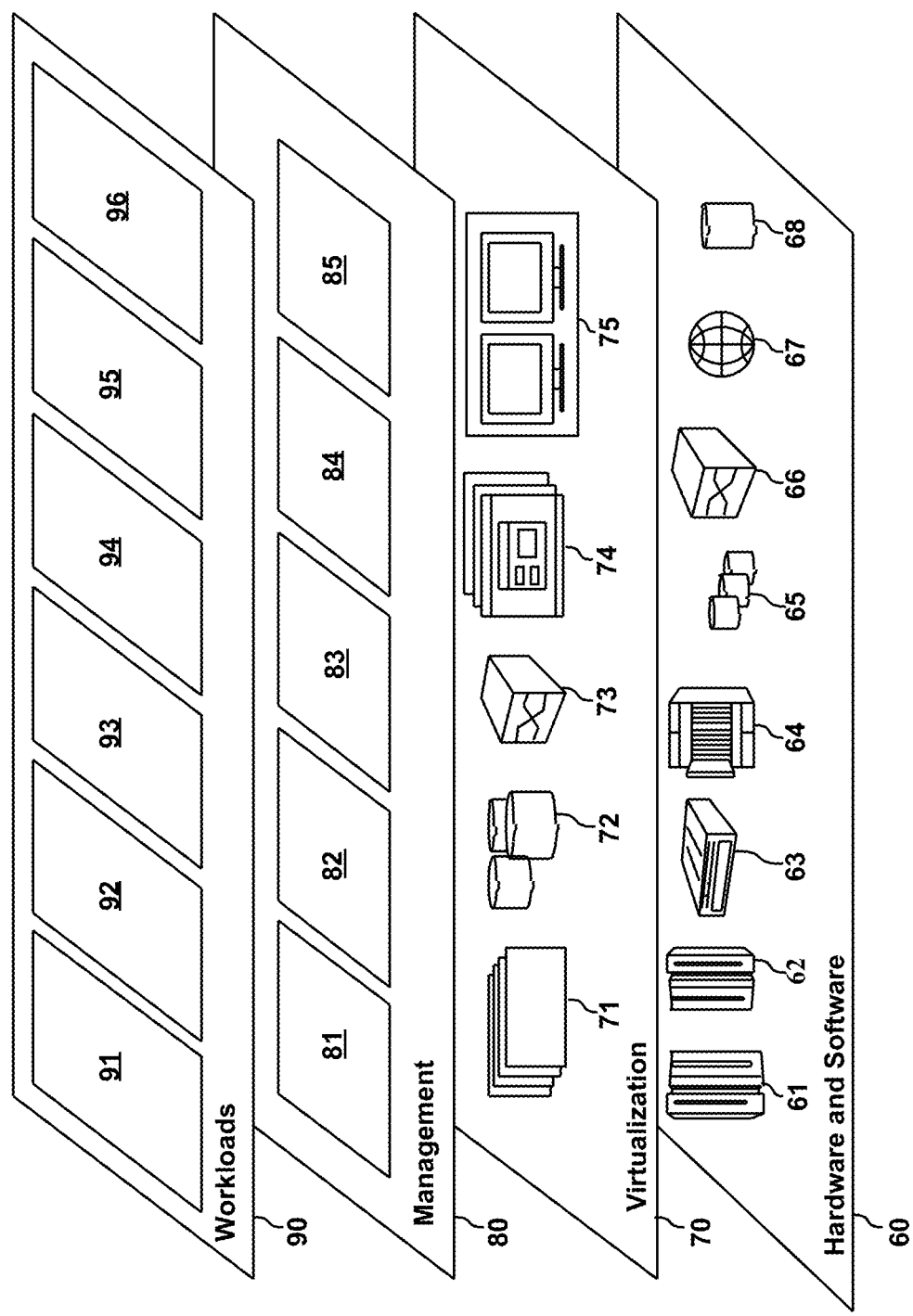
FIG. 13 is a block diagram of functional layers of the cloud computing environment of FIG. 12, according to an embodiment of the invention.

SAMPLE DIGITAL AGREEMENT RECORD & DATA FIELDS length of time digital twin will remain accessible, for example 20 years
required initial files to satisfy the digital twin requirements:
User Manuals
Bill of Material
Warranty Bulletins
Warranty Claims
Maintenance Plans
Maintenance History
Part Replacement/Usage History
Specifications
3D model/CAD drawings
Fault Codes
Scheduled Maintenance Plans
Operating Manuals
Usage, such as IoT Sensor Readings
AI/Prediction Models, Forecasts, and Related Data
Operating History
Owner
Change in Ownership In an embodiment, first storage device 706 is a computing node 10 (for example, as described in connection with FIG. 11) in a cloud computing environment (FIGS. 12-13). Such a node 10 may be, for example, a storage node in a cloud storage infrastructure.

In an embodiment, method 800 associates (step 804) a unique identifier with digital representation 704 of physical asset 702. Associating the unique identifier generally may refer to creating an ID or other unique identifying information for the digital representation record in accordance with processes described in connection with FIGS. 1A-B and 2, above (for example, at element 202). In an embodiment, the unique identifier is an encrypted unique identifier and has a corresponding decrypted unique identifier. Either the encrypted or decrypted unique identifier may be associated with digital representation 704 of physical asset 702.

In an embodiment, method 800 records (step 806), in digital registry 708, a data record (not shown) comprising the unique identifier and a location (storage location) of digital representation 704 of physical asset 702. The location comprises location information of first storage device 706. For example, method 800 records, in digital registry 708, that Digital Twin B for the truck is stored on first storage device 706. In one example, the digital record may provide:

[Digital Twin B Unique ID]|[IP ADDRESS of first storage device 706]

In an embodiment, method 800 provides (step 808), in response to receiving a lookup request by a user, the location (for example, location of first storage device 706) of digital representation 704 of physical asset 702. The lookup request may include the unique identifier of digital representation 704 of physical asset 702. In an embodiment, in providing the location of digital representation 704 may also include providing a retrieved digital representation 710 of physical asset 702. Retrieved digital representation 710 is depicted as an illustrative example of how a new data record corresponding to a digital representation of a physical asset can be copied from its stored location and provided to a user (for example, it may be communicated to a user device) for access to read and write to the digital representation. It is not necessary for practicing all embodiments of the invention to create a separate digital representation of a physical asset; i.e., in some embodiments, digital representation 704 and digital representation 710 may be the same. In yet other embodiments, digital representation 710 refers to any one of digital representations 704 that is retrieved based on a lookup operation. In an embodiment, the lookup request comprises a scanned reading of a physical tag, the scanned reading comprising the unique identifier. The physical tag may be any tag as provided in this disclosure. The physical tag may be a tag that contains information about digital representation 704 in encrypted or decrypted form. For example, the physical tag may be a QR code that, when read, reveals an encrypted, decrypted, or unencrypted unique identifier. Any such value may be used to perform functions described in the present disclosure.

In an embodiment, method 800 confirms (step 838), via a reading from an IoT device (for example, an IoT device of, at, on, or near physical asset 702), physical tagging of physical asset 702 corresponding to digital representation 704 of physical asset 702. In an embodiment, confirmation of tagging may be a pre-requisite of one or more operations performed corresponding to digital representation 704. For example, confirmation may be a required function before a data record for digital representation 704 is recorded (step 806) in digital repository 708. In another embodiment, confirmation may be performed after the recording (step 806). At any time upon recording (step 806) and or upon confirming (step 838), a user can receive an indication of the recording or confirmation. Such recording or confirmation may also be maintained as part of digital representation 704 (i.e., it may be an attribute or part of a history of digital representation 704).

In an embodiment, method 800 provides (step 840), in response to receiving a lookup request by or from a user, one or more of the plurality of attributes (not shown) of digital representation 704 of physical asset 702. For example, method 800 identifies Digital Twin B as corresponding to the user request, and based on appropriate access control checks, provides one or more attributes of Digital Twin B, or some or all data associated with Digital Twin B, to the user. The data and/or the plurality of attributes may be those provided in connection with FIGS. 1A-B-2, or any other attribute (for example, as provided under the heading Definitions).

Figure 8B:
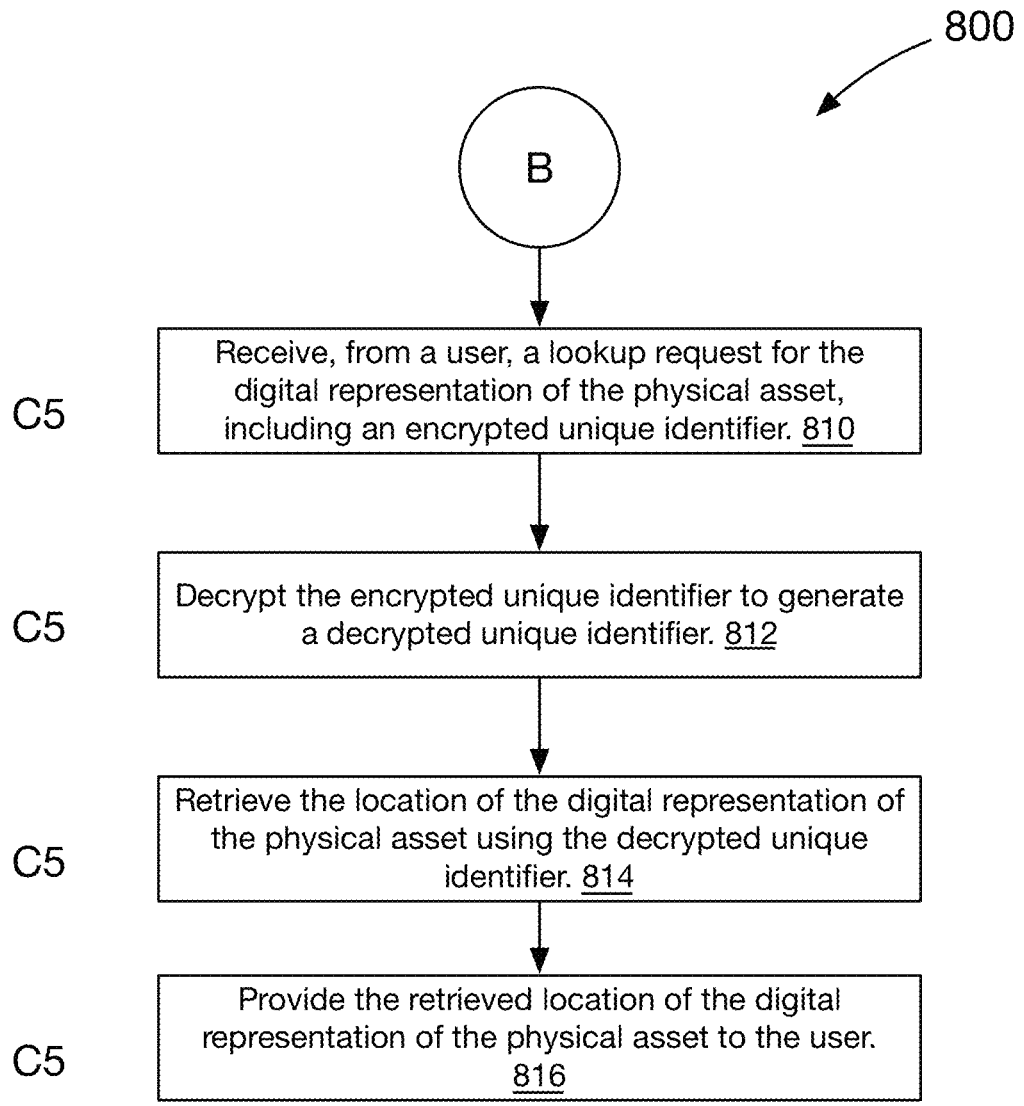

Referring now to FIGS. 7 and 8B, method 800 for managing a digital representation 704 of a physical asset 702 executes according to flow "B", and receives (step 810), from a user, a lookup request for digital representation 704 of physical asset 702, the request comprising an encrypted unique identifier (for example, as described in connection with step 804 in FIG. 8A).

In an embodiment, method 800 decrypts (step 812) the encrypted unique identifier to generate the decrypted unique identifier.

In an embodiment, method 800 retrieves (step 814) the location of digital representation 704 of physical asset 702 using the decrypted unique identifier; for example, the location of first storage device 706.

In an embodiment, method 800 provides (step 816) the retrieved location of digital representation 704 of physical asset 702 to the user.

Figure 8C:
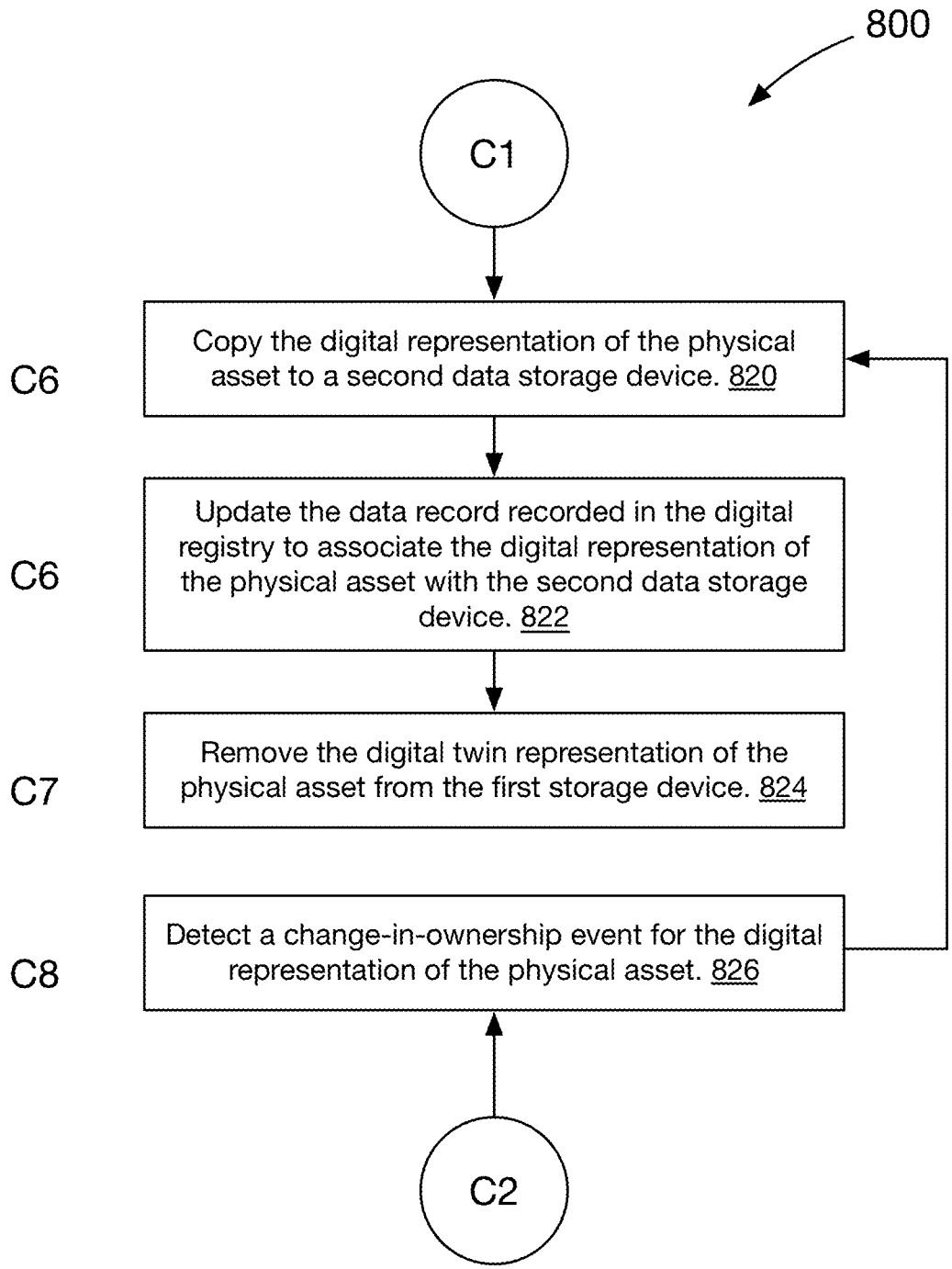

Referring now to FIGS. 7 and 8C, method 800 for managing a digital representation 704 of a physical asset 702 executes according flow "C1", and copies (step 820) digital representation 704 of physical asset 702 to a second storage device (not shown, but it may be similar to first storage device 706). Copying may be initiated via a copy command or instruction for any reason deemed useful or desirable according to embodiments of the invention, including, for example, to create back up records of digital representations 704 in case of failures (in hardware, software, connection, corruption, authentication, security, or other failure) of first storage device 706.

In an embodiment, method 800 updates (step 822) the data record recorded in digital registry 708 (stored on first storage device 706 and/or another storage device where such records may be maintained) to associate digital representation 704 of physical asset 702 with the second storage device. Multiple such updates may be performed for as many data storage devices (for example, in a cloud environment). In an embodiment, the update may be made to a blockchain storing digital representation 704 of physical asset 702.

In an embodiment, method 800 removes (step 824) digital representation 704 of physical asset 702 from first storage device 706. This function may be performed for any reason, and may be useful in at least instances where first storage device 706 is no longer a suitable or desired storage location (for example, first storage device 706 changes ownership, fails, or is decommissioned, or physical asset 702 undergoes changes such as failure, decommissioning, or transfer that require a corresponding change to its digital representation 704).

With continued reference to FIGS. 7 and 8C, method 800 may execute according to flow "C2", an detects (step 826) a change-in-ownership event for digital representation 704 of physical asset 702. A change-in-ownership event may generally be defined as detecting an update to an ownership attribute of digital representation 704 of physical asset 702. Method 800 may perform one or more steps of flow "C1" as described above (steps 820, 822, 824) as needed. Method 800 may update (step 822) an ownership attribute in the plurality of attributes of digital representation 704 of physical asset 702 to reflect the change in value of the attribute.

Figure 8D:
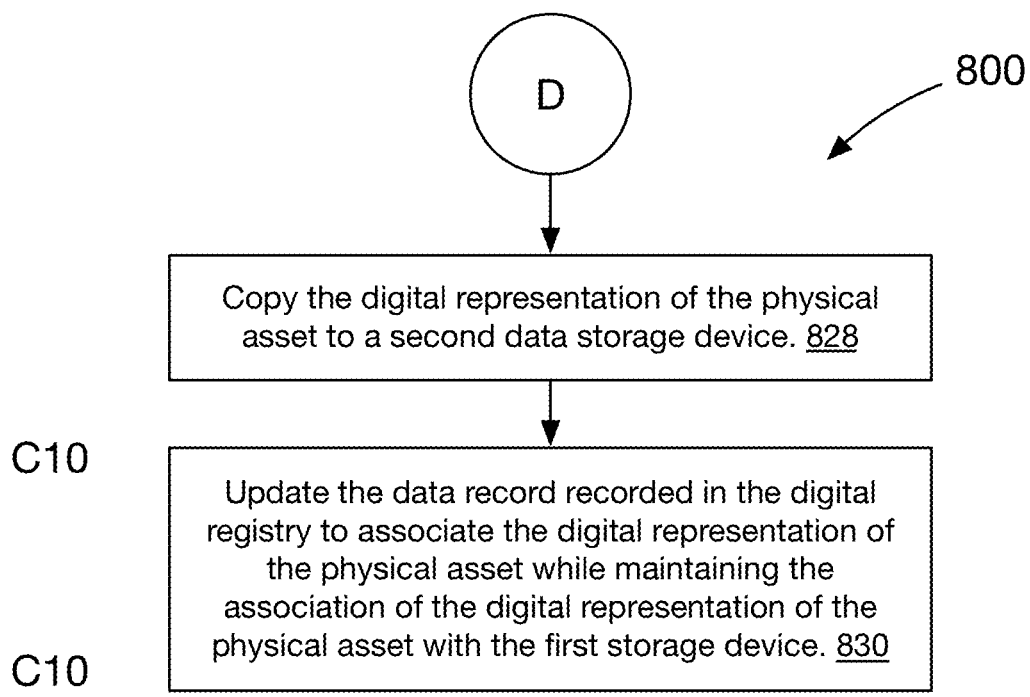
Figure 8E:
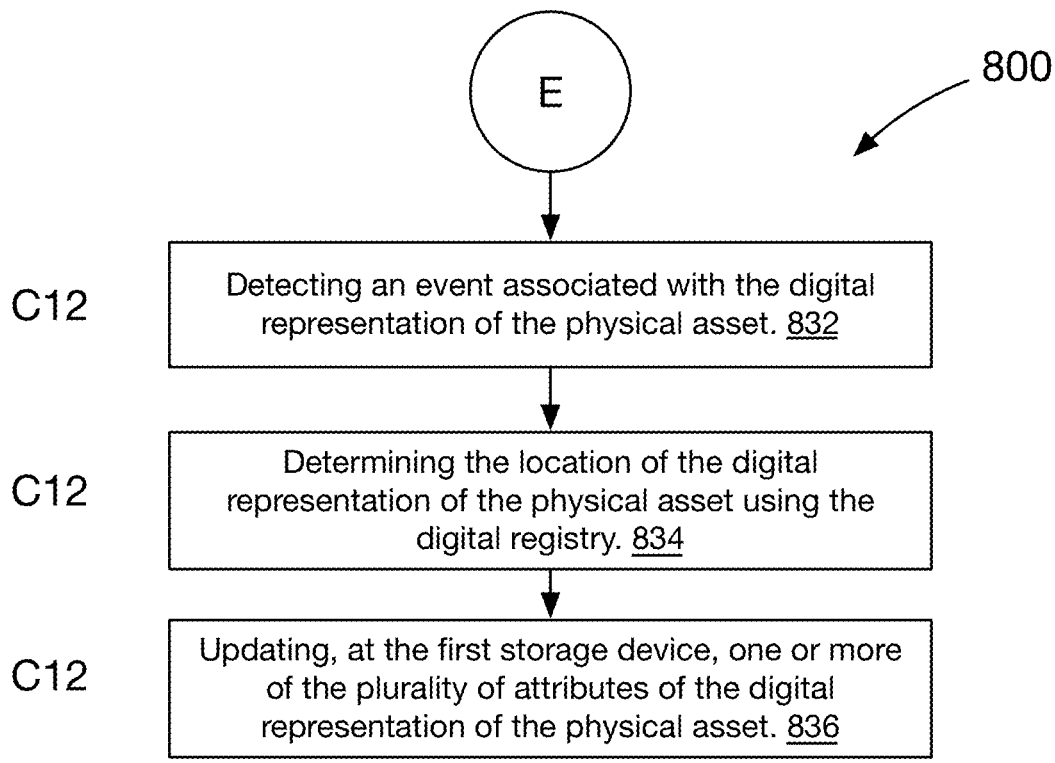

Referring now to FIGS. 7 and 8D, method 800 for managing a digital representation 704 of a physical asset 702 executes according flow "D", and copies (step 828) digital representation 704 of physical asset 702 to a second storage device (not shown, but it may be similar to first storage device 706).

In an embodiment, method 800 updates (830) the data record recorded in digital registry 708 to associate digital representation 704 of physical asset 702 with the second storage device (not shown), while maintaining the association of digital representation 704 of physical asset 702 with first storage device 706.

Referring now to FIGS. 7 and 8D, method 800 for managing a digital representation 704 of a physical asset 702 executes according flow "E", and detects (step 832) an event associated with digital representation 704 of physical asset 702. Detecting an event may occur according to processes and functions described in connection with FIGS. 1A-B-2, and may include, in an embodiment, receiving data that indicates a change (or a request for a change) in an attribute of digital representation 704 of physical asset 702.

In an embodiment, method 800 determines (step 834), in response to detecting the event (step 832), the location of digital representation 704 of physical asset 702 using digital registry 708. For example, method 800 determines that Digital Twin B is stored on first storage device 706 by using a unique identifier of Digital Twin B to lookup the location information of Digital Twin B in digital registry 708.

In an embodiment, method 800 updates (step 836), at first storage device 706, one or more of the plurality of attributes of digital representation 704 of physical asset 702 based on attribute changes defined and/or detected as part of the event detected (step 832).

Figure 9:
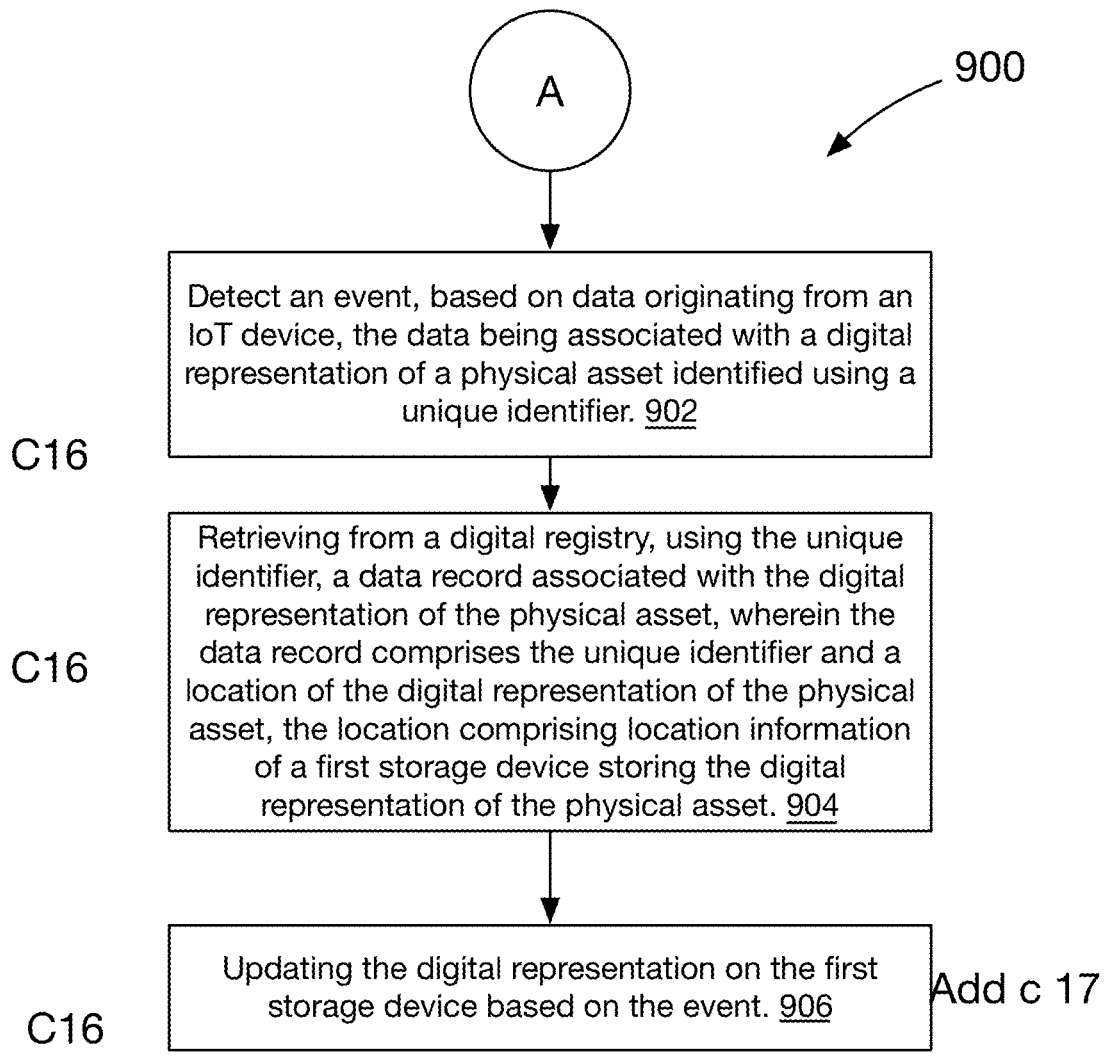
FIG. 9 is a flowchart of a method 900 for managing a digital representation of a physical asset, according to an embodiment of the invention.

FIG. 9 is a flowchart depicting illustrative steps of a method 900 for managing digital representation 704 of physical asset 702, as described in connection with FIGS. 1A-B, 2, and 7, according to an embodiment of the invention.

Referring now to FIGS. 7 and 9, method 900 for managing digital representation 704 of physical asset 702 executes according to flow "A", and detects (step 902) an event, based on data originating from an Internet-of-Things (IoT) device (for example, an IoT sensor of physical asset 702), the event being associated with digital representation 704 of physical asset 702 identified using a unique identifier.

In an embodiment, method 900 retrieves (step 904) from digital registry 708, using the unique identifier, a data record associated with digital representation 704 of physical asset 702, wherein the data record comprises the unique identifier and a location of digital representation 704 of physical asset 702, the location comprising location information of first storage device 706 storing digital representation 704 of physical asset 702.

In an embodiment, method 900 updates (step 906) digital representation 704 on first storage device 706 based on the event. In an embodiment, updating (step 906) digital representation 704 on first storage device 706 is performed by updating one or more attributes of digital representation 704 based on data recorded in the detected event (for example, attribute values or changes).

Figure 10:
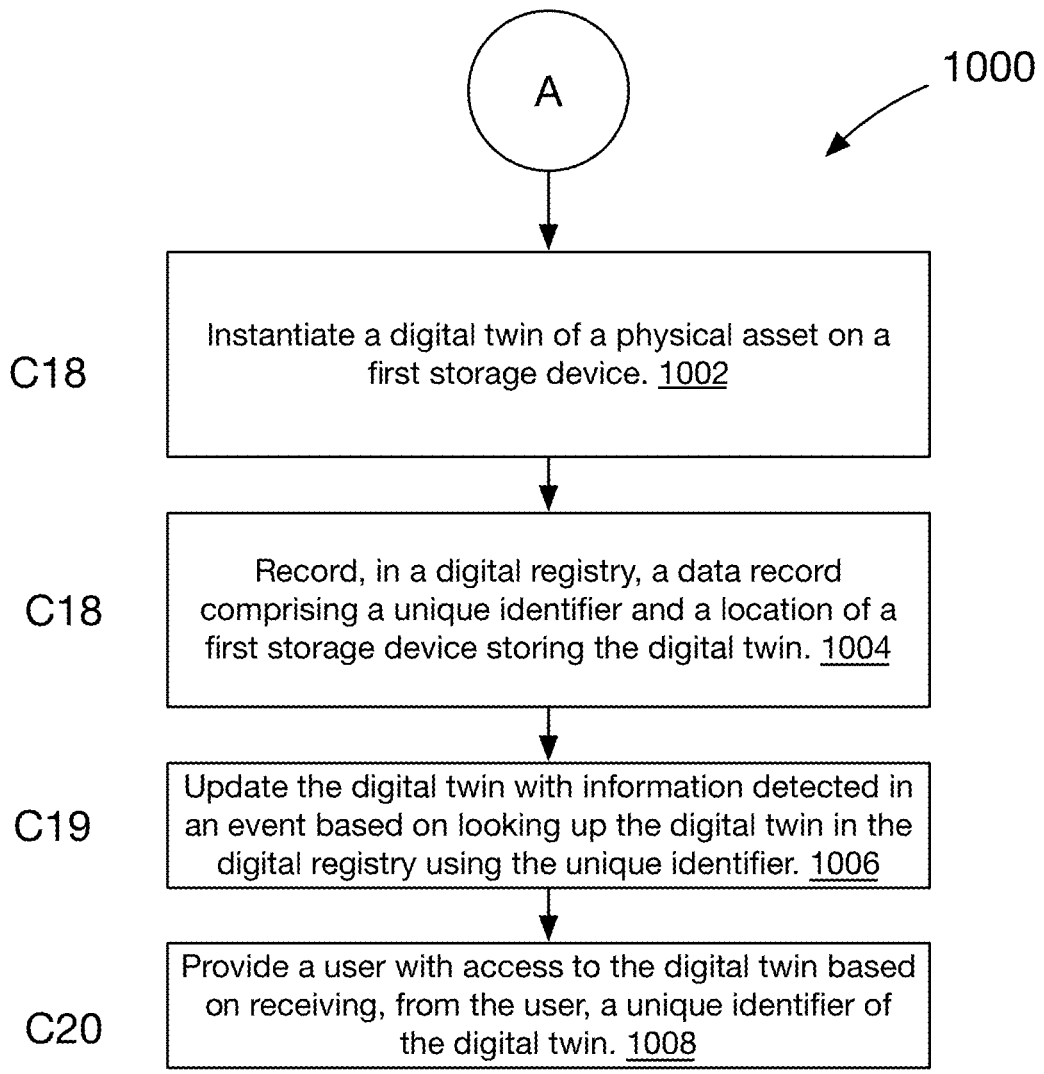
FIG. 10 is a flowchart of a method 1000 for managing a digital twin, according to an embodiment of the invention.

FIG. 10 is a flowchart depicting illustrative steps of a method 1000 for managing a digital twin of a physical asset, as described in connection with FIGS. 1A-B, 2, and 7, according to an embodiment of the invention.

Referring now to FIGS. 7 and 10, method 1000 for managing a digital twin of a physical asset executes according to flow "A", and instantiates (step 1002) a digital twin of a physical asset on a first storage device. The digital twin may be a digital presentation 706.

In an embodiment, method 1000 records (step 1004), in digital registry 708), a data record comprising a unique identifier and a location of first storage device 706 storing the digital twin.

In an embodiment, method 1000 updates (step 1006) the digital twin with information detected in an event based on looking up the digital twin in digital registry 708 using the unique identifier.

In an embodiment, method 1000 provides (step 1008) a user with access to the digital twin based on receiving, from the user, a unique identifier of the digital twin.

Figure 11:
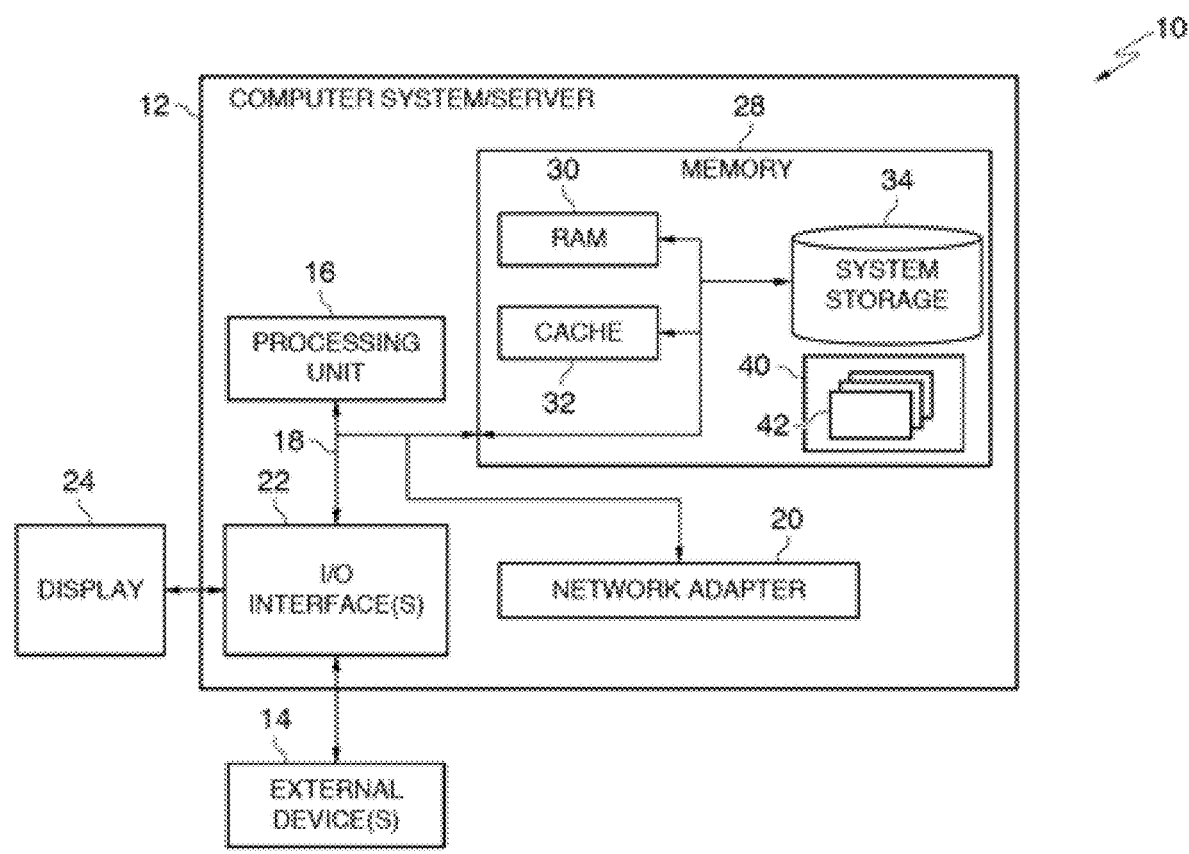
FIG. 11 is a block diagram of an illustrative cloud computing node, according to an embodiment of the invention.

FIG. 11 is a block diagram of an illustrative cloud computing node, according to an embodiment of the invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove (for example, in connection with FIGS. 1A-B-10, above, and particularly first storage device 706, IoT devices, and other components described in connection with FIG. 7).

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 12 is a block diagram of a cloud computing environment including the cloud computing node of FIG. 11, according to an embodiment of the invention. Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

FIG. 13 is a block diagram of functional layers of the cloud computing environment of FIG. 12, according to an embodiment of the invention. Referring now to FIG. 13, a set of functional abstraction layers provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; digital twin processing/digital representation processing/IoT processing/blockchain processing 96, including those described in connection with FIGS. 1A-B-11, above.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing a digital representation of a physical asset, comprising:
   instantiating a digital representation comprising a digital twin of a physical asset on a first tangible storage device, the digital representation having a plurality of attributes, and wherein the digital twin is an evolving virtual data model that mimics the physical asset and all associated experiences and state changes;
   associating a unique identifier with the digital representation of the physical asset;
   recording, in a digital registry, a data record comprising the unique identifier and a location of the digital representation of the physical asset, the location comprising location information of the first storage device;
   responsive to detecting a change in ownership event, copying the digital representation of the physical asset to a second storage device, wherein the first and second storage devices are separate tangible storage devices;
   updating the data record recorded in the digital registry to associate the digital representation of the physical asset with the second storage device in addition to the first storage device; and
   removing the digital representation of the physical asset from the first storage device.

2. The method of claim 1, further comprising:
   providing, in response to receiving a lookup request by a user, the location of the digital representation of the physical asset, the lookup request comprising the unique identifier.

3. The method of claim 2, wherein the lookup request comprises a scanned reading of a physical tag, the scanned reading comprising the unique identifier.

4. The method of claim 1, wherein the unique identifier is an encrypted unique identifier and has a corresponding decrypted unique identifier.

5. The method of claim 4, further comprising:
   receiving, from a user, a lookup request for the digital representation of the physical asset, the lookup request comprising the encrypted unique identifier;
   decrypting the encrypted unique identifier to generate the decrypted unique identifier;
   retrieving the location of the digital representation of the physical asset using the decrypted unique identifier; and
   providing the retrieved location of the digital representation of the physical asset to the user.

6. The method of claim 1, wherein the updating further comprises:
   updating an ownership attribute in the plurality of attributes of the digital representation of the physical asset.

7. The method of claim 1, further comprising:
   updating the data record recorded in the digital registry to associate the digital representation of the physical asset with the second storage device, while maintaining the association of the digital representation of the physical asset with the first storage device.

8. The method of claim 1, wherein the first storage device is a computing node in a cloud computing environment.

9. The method of claim 1, further comprising:
   detecting an event associated with the digital representation of the physical asset;
   determining, in response to detecting the event, the location of the digital representation of the physical asset using the digital registry;
   updating, at the first storage device, one or more of the plurality of attributes of the digital representation of the physical asset.

10. The method of claim 1, wherein instantiating the digital representation of the physical asset on a first storage device comprises:
    defining initial values of the plurality of attributes of the digital representation of the physical asset using one or more data fields of a digital agreement record.

11. The method of claim 10, wherein the one or more data fields of the digital agreement record are selected from a list consisting of:
    a user manual data field, a bill of material data field, a warranty bulletin data field, a warranty claim data field, a maintenance plan data field, a maintenance history data field, a part replacement data field, a part usage data field, a physical asset specification data field, a 3-dimensional model data field, a computer-aided design data field, a fault code data field, a scheduled maintenance data field, an operating manual data field, an Internet-of-Things (IoT) sensor reading data field, an artificial intelligence model data field, a data prediction model data field, an operating history data field, an ownership data field, and a change in ownership data field.

12. The method of claim 1, further comprising:
confirming, via a reading from an IoT device, physical tagging of the physical asset corresponding to the digital representation of the physical asset.

13. The method of claim 1, further comprising:
providing, in response to receiving a lookup request by a user, one or more of the plurality of attributes of the digital representation of the physical asset.

14. A method for managing a digital representation of a physical asset, comprising:
detecting a maintenance event, based on data originating from an Internet-of-Things (IoT) device, the maintenance event being associated with the digital representation of the physical asset identified using a unique identifier;
retrieving from a digital registry, using the unique identifier, a data record associated with the digital representation of the physical asset, wherein the data record comprises the unique identifier and a location of the digital representation of the physical asset, the location comprising location information of a first storage device storing the digital representation of the physical asset;
updating the digital representation on the first storage device based on the maintenance event;
updating a criticality and a reliability of the physical asset based on the detected maintenance event, wherein the criticality is based on a mean time to recovery (MTTR) for the physical asset and a quality of a plurality of parts comprising the asset, and wherein the reliability is based on the criticality and a usage rate of the parts; and
predicting a life of the physical asset based on the criticality and reliability.

15. The method of claim 14, wherein updating the digital representation on the first storage device based on the maintenance event comprises:
updating one or more attributes of the digital representation based on data recorded in the detected maintenance event.

16. A method, comprising:
instantiating a digital twin of a physical asset on a first storage device;
recording, in a digital registry, a data record comprising a unique identifier and a location of the first storage device storing the digital twin;
responsive to receiving a lookup request including the unique identifier from a user, transmitting a new copy of the digital twin from the first storage device to a second storage device associated with the user, wherein the first storage device and the second storage device are separate tangible storage devices, wherein the user is enabled to read and write to the digital twin, and wherein the digital twin is an evolving virtual data model that mimics the physical asset and all associated experiences and state changes; and
updating the data record recorded in the digital registry to associate the digital representation of the physical asset with the second storage device in addition to the first storage device.

17. The method of claim 16, further comprising:
updating the digital twin with information detected in an event based on looking up the digital twin in the digital registry using the unique identifier.

18. The method of claim 16, further comprising:
providing the user with access to the digital twin based on receiving, from the user, a unique identifier of the digital twin.

* * * * *